(12) United States Patent
Dupuis et al.

(10) Patent No.: US 10,244,296 B1
(45) Date of Patent: Mar. 26, 2019

(54) PLANAR PHOTONIC SWITCH FABRICS WITH REDUCED WAVEGUIDE CROSSINGS

(71) Applicant: International Business Machines Corporation, Armonk, NY (US)

(72) Inventors: Nicolas Dupuis, New York, NY (US); Benjamin Lee, Ridgefield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/839,309

(22) Filed: Dec. 12, 2017

(51) Int. Cl.
| | |
|---|---|
| *H04Q 11/00* | (2006.01) |
| *G02B 6/35* | (2006.01) |
| *H04L 12/933* | (2013.01) |
| *H04L 12/751* | (2013.01) |
| *H04L 12/935* | (2013.01) |

(52) U.S. Cl.
CPC ....... *H04Q 11/0005* (2013.01); *G02B 6/3546* (2013.01); *H04L 45/02* (2013.01); *H04L 49/10* (2013.01); *H04L 49/30* (2013.01); *H04Q 11/0062* (2013.01); *H04Q 2011/0049* (2013.01)

(58) Field of Classification Search
CPC ........... H04Q 11/0005; H04Q 11/0062; H04Q 2011/0049; G02B 6/3546; H04L 45/02; H04L 49/10; H04L 49/30
USPC .......................................................... 385/17
See application file for complete search history.

(56) References Cited

U.S. PATENT DOCUMENTS

| | | | |
|---|---|---|---|
| 6,684,008 | B2 | 1/2004 | Young et al. |
| 8,009,943 | B2 | 8/2011 | Bratkovski et al. |
| 8,644,661 | B2 | 2/2014 | Doerr |
| 8,655,124 | B2 | 2/2014 | Fattal et al. |
| 9,229,163 | B2 | 1/2016 | Schwetman, Jr. et al. |
| 9,316,784 | B2 | 4/2016 | Krishnamoorthy et al. |
| 9,363,581 | B2 | 6/2016 | Fondeur |
| 9,602,432 | B2 | 3/2017 | Lee et al. |
| 9,709,738 | B1 | 7/2017 | Dumais |
| 2005/0084264 | A1 | 4/2005 | Kumaran et al. |
| 2011/0176804 | A1* | 7/2011 | Blinkert ................. G02B 6/356 |
| | | | 398/45 |

(Continued)

OTHER PUBLICATIONS

U.S. Appl. No. 15/839,309, filed Dec. 12, 2017.

(Continued)

*Primary Examiner* — Jerry Blevins
(74) *Attorney, Agent, or Firm* — Amin, Turocy & Watson, LLP

(57) ABSTRACT

Techniques for using planar photonic switch fabrics with reduced waveguide crossings are described. In one embodiment, a system is provided that comprises a memory that stores computer-executable components and a processor that executes computer-executable components stored in the memory. In one implementation, the computer-executable components comprise an arrangement component that arranges a first planar switch fabric topology. The computer-executable components further comprise a transformation component that interleaves a plurality of inputs of the first planar switch fabric topology and a plurality of outputs of the first planar switch fabric topology to form a second planar switch fabric topology, the second planar switch fabric topology having a lower number of waveguide crossings than the first planar switch fabric topology.

9 Claims, 30 Drawing Sheets

(56) References Cited

U.S. PATENT DOCUMENTS

2015/0116603 A1* 4/2015 Guthrie .............. H04N 9/3182
348/758
2016/0277319 A1 9/2016 Lee et al.
2017/0115514 A1 4/2017 Rad
2018/0120422 A1* 5/2018 Fujita .................. G01S 7/4817

OTHER PUBLICATIONS

U.S. Appl. No. 15/839,275, filed Dec. 12, 2017.
U.S. Appl. No. 15/839,337, filed Dec. 12, 2017.
Jajszczyk et al., "Tree-type photonic switching networks," IEEE Network, Jan./Feb. 1995, vol. 9, Issue 1, pp. 10-16, 7 pages.
Savastano et al., "Low-crossover Extended Generalized Shuffle Network for Photonic Switching Applications," 2007 Workshop on High Performance Switching and Routing, 2007, 6 pages.
Non-Final Office Action received for U.S. Appl. No. 15/839,275 dated Jun. 21, 2018, 36 pages.
Tervonen, Ari, "Software tools for integrated optics design," published in SPIE 2997, Integrated Optics Devices: Potential for Commercialization, Jan. 23, 1997, pp. 201-211.
Notice of Allowance for U.S. Appl. No. 15/839,275, dated Oct. 15, 2018.

* cited by examiner

2100

PLANAR PHOTONIC SWITCH FABRICS WITH REDUCED WAVEGUIDE CROSSINGS

BACKGROUND

The subject disclosure relates to implementing planar photonic switch fabrics with reduced waveguide crossings.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments, systems, computer-implemented methods, apparatus and/or computer program products that facilitate planar photonic switch fabrics with reduced waveguide crossings are disclosed.

According to an embodiment, a system is provided that can comprise a memory that stores computer-executable components and a processor that executes computer-executable components stored in the memory. In one or more implementations, the computer-executable components comprise an arrangement component that arranges a first planar switch fabric topology. The computer-executable components further comprise a transformation component that interleaves a plurality of inputs of the first planar switch fabric topology and a plurality of outputs of the first planar switch fabric topology to form a second planar switch fabric topology, the second planar switch fabric topology having a lower number of waveguide crossings than the first planar switch fabric topology.

In another embodiment, a computer-implemented method is provided. In one example, the computer-implemented method comprises arranging, by a system operatively coupled to a processor, a first planar switch fabric topology. The computer-implemented method can further comprise interleaving, by the system, a plurality of inputs of the first planar switch fabric topology and a plurality of outputs of the first planar switch fabric topology to form a second planar switch fabric topology, the second planar switch fabric topology having a lower number of waveguide crossings than the first planar switch fabric topology.

In another embodiment, a computer program product that facilitates implementation of planar photonic switch fabrics with reduced waveguide crossings is provided, the computer program product comprising a computer readable storage medium having program instructions embodied therewith. The program instructions executable by a processor can cause the processor to arrange a first planar switch fabric topology. The program instructions executable by a processor can further cause the processor to interleave a plurality of inputs of the first planar switch fabric topology and a plurality of outputs of the first planar switch fabric topology to form a second planar switch fabric topology, the second planar switch fabric topology having a lower number of waveguide crossings than the first planar switch fabric topology.

According to an embodiment, a system is provided that can comprise a memory that stores computer-executable components and a processor that executes computer-executable components stored in the memory. In one or more implementations, the computer-executable components comprise an arrangement component that arranges a first planar switch fabric topology. The computer-executable components further comprise a waveguide routing component that routes a first waveguide of the first planar switch fabric topology around a perimeter of a first input/output (I/O) stage of the first planar switch fabric topology to produce a second planar switch fabric topology, the first I/O stage being located on an interior of the second planar switch fabric topology, and the second planar switch fabric topology having a lower number of waveguide crossings than the first planar switch fabric topology.

In another embodiment, a computer-implemented method is provided. In one example, the computer-implemented method comprises arranging, by a system operatively coupled to a processor, a first planar switch fabric topology. The computer-implemented method can further comprise routing, by the system, a first waveguide of the first planar switch fabric topology around a perimeter of a first I/O stage of the first planar switch fabric topology to produce a second planar switch fabric topology, the first I/O stage being located on an interior of the second planar switch fabric topology, and the second planar switch fabric topology having a lower number of waveguide crossings than the first planar switch fabric topology.

In another embodiment, a computer program product that facilitates implementation of planar photonic switch fabrics with reduced waveguide crossings is provided, the computer program product comprising a computer readable storage medium having program instructions embodied therewith. The program instructions executable by a processor can cause the processor to arrange a first planar switch fabric topology. The program instructions executable by a processor can further cause the processor to route a first waveguide of the first planar switch fabric topology around a perimeter of a first I/O stage of the first planar switch fabric topology to produce a second planar switch fabric topology, the first I/O stage being located on an interior of the second planar switch fabric topology, and the second planar switch fabric topology having a lower number of waveguide crossings than the first planar switch fabric topology.

According to an embodiment, a system is provided that can comprise a memory that stores computer-executable components and a processor that executes computer-executable components stored in the memory. In one or more implementations, the computer-executable components comprise an arrangement component that arranges a first planar switch fabric topology. The computer-executable components further comprise a transposition component that transposes a first portion of an input stage of the first planar switch fabric topology, and nests an input of a first switch element of the transposed first portion within an output of a second switch element of the transposed first portion to form a second planar switch fabric topology, the second planar switch fabric topology having a lower number of waveguide crossings than the first planar switch fabric topology.

In another embodiment, a computer-implemented method is provided. In one example, the computer-implemented method comprises arranging, by a system operatively coupled to a processor, a first planar switch fabric topology. The computer-implemented method can further comprise transposing, by the system, a first portion of an input stage of the first planar switch fabric topology, and nesting an input of a first switch element of the transposed first portion within an output of a second switch element of the transposed first portion to form a second planar switch fabric topology, the second planar switch fabric topology having a lower number of waveguide crossings than the first planar switch fabric topology.

In another embodiment, a computer program product that facilitates implementation of planar photonic switch fabrics with reduced waveguide crossings is provided, the computer program product comprising a computer readable storage medium having program instructions embodied therewith. The program instructions executable by a processor can cause the processor to arrange a first planar switch fabric topology. The program instructions executable by a processor can further cause the processor to transpose a first portion of an input stage of the first planar switch fabric topology, and nest an input of a first switch element of the transposed first portion within an output of a second switch element of the transposed first portion to form a second planar switch fabric topology, the second planar switch fabric topology having a lower number of waveguide crossings than the first planar switch fabric topology.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The subject disclosure is directed to computer processing systems, computer-implemented methods, apparatus and/or computer program products that facilitate planar photonic switch fabrics with reduced waveguide crossings.

A planar photonic switch fabric can generally comprise a network topology in which network nodes interconnect via one or more network switches. The switch fabric can be described as planar because it takes a roughly planar physical shape. The switch fabric can be described as photonic because it uses optical signals to transmit data. A waveguide can generally comprise a structure that guides an optical wave within a planar photonic switch fabric.

A planar photonic switch fabric can comprise a plurality of waveguides, and these waveguides can have one or more waveguide crossings—a point at which two waveguides intersect, or otherwise interact. A waveguide crossing can diminish the performance of a planar photonic switch fabric because at that crossing point, two signals can interfere with each other or corrupt each other. Then, as a number of waveguide crossings decreases in a switch fabric, a corresponding performance of the switch fabric can increase. The following includes a description of techniques for planar photonic switch fabrics with reduced waveguide crossings.

Figure 1:
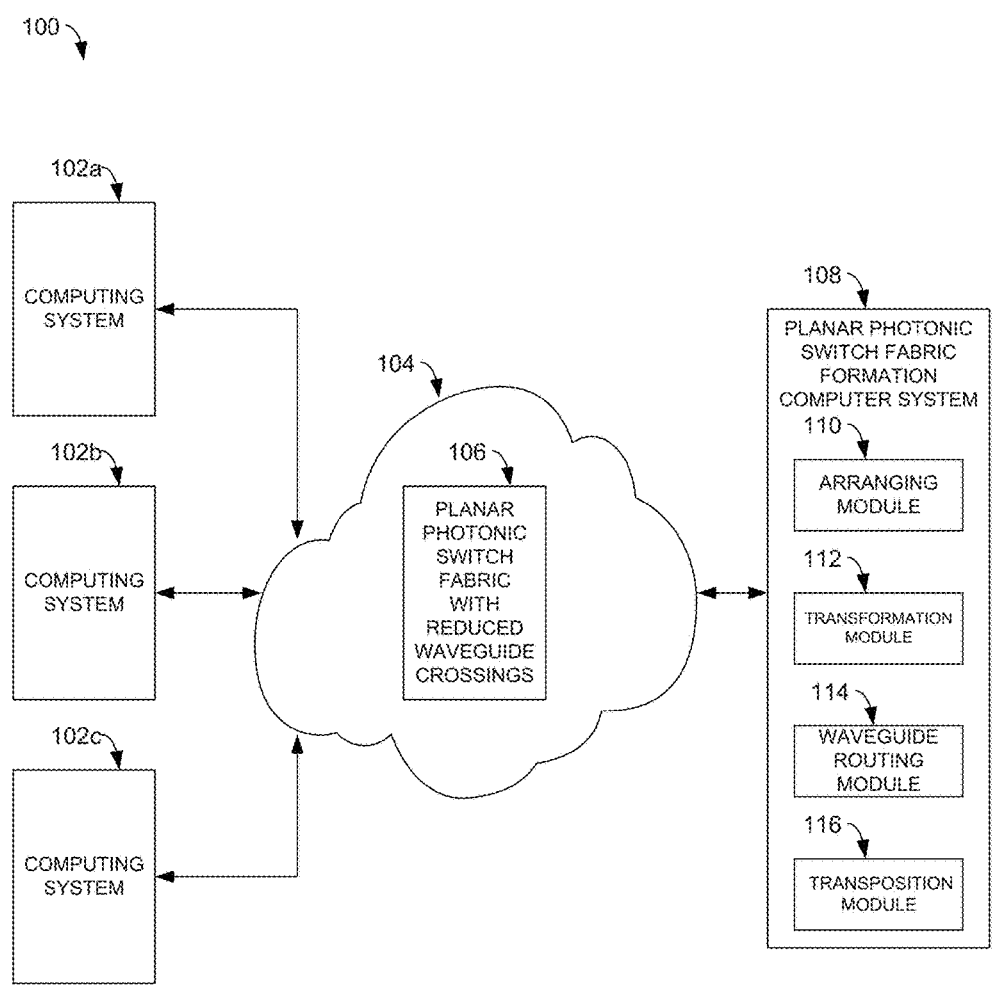
FIG. 1 illustrates an example, non-limiting computing system for planar photonic switch fabrics with reduced waveguide crossings that can be implemented in accordance with one or more embodiments described herein.

FIG. 1 illustrates an example, non-limiting computing system for planar photonic switch fabrics with reduced waveguide crossings that can be implemented in accordance with one or more embodiments described herein. Depicted in computing system 100, there is computing system 102a, computing system 102b, computing system 102c, Internet 104, planar photonic switch fabric with reduced waveguide crossings 106, planar photonic switch fabric formation computing system 108, arranging module 110, transformation module 112, waveguide routing module 114, and transposition module 116.

Computing system 102a, computing system 102b, and computing system 102c can be communicatively networked, and communicate via Internet 104, a global communications network. Internet 104, as depicted, can comprise planar photonic switch fabric with reduced waveguide crossings 106. Planar photonic switch fabric with reduced waveguide crossings 106 can be a switch fabric that is created according to one or more non-limiting embodiments described herein.

As depicted in FIG. 1, planar photonic switch fabric with reduced waveguide crossings 106 can be arranged by planar photonic switch fabric formation computing system 108, which comprises a plurality of modules. Arranging module 110 can implement operations similar to as described with respect to operation 1102, operation 1202, or operation 2902. Transformation module 112 can implement an operation similar to as described with respect to operation 1104. Waveguide routing module 114 can implement operations similar to as described with respect to operation 1204. Transposition module 116 can implement operations similar to as described with respect to operation 2904. It can be appreciated that there are examples that do not implement all of the modules depicted in planar photonic switch fabric formation computing system 108. For instance, using the example of FIG. 11, there can be an example that implements arranging module 110 and transformation module 112, without implementing waveguide routing module 114 or transposition module 116.

Figure 2:
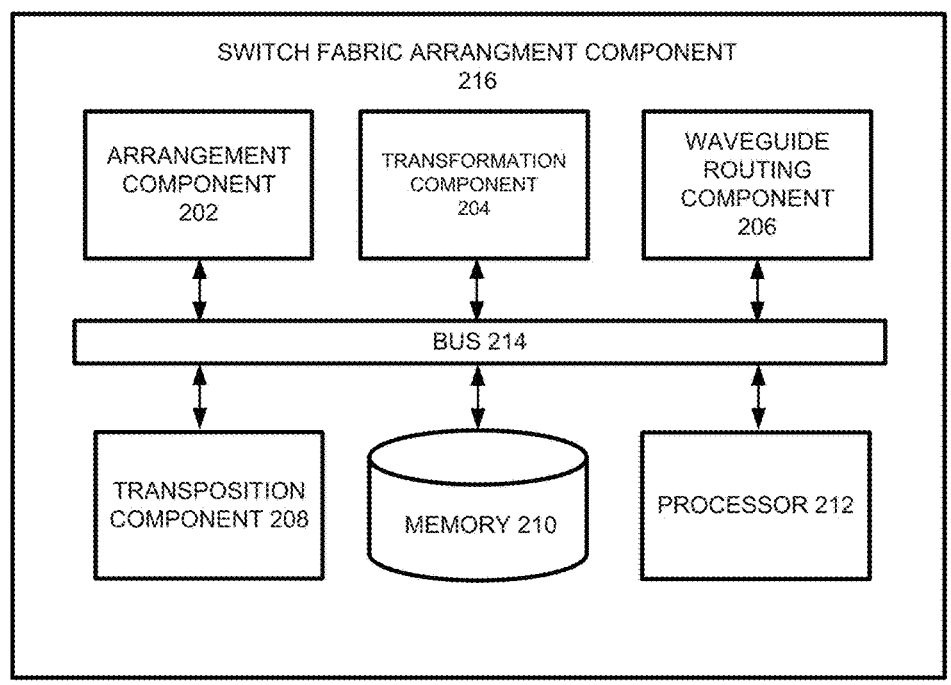
FIG. 2 illustrates a block diagram of an example, non-limiting computer system that facilitates implementing planar photonic switch fabrics with reduced waveguide crossings in accordance with one or more embodiments described herein.

FIG. 2 illustrates a block diagram of an example, non-limiting computer system that facilitates implementing planar photonic switch fabrics with reduced waveguide crossings in accordance with one or more embodiments described herein. Computer system 200 can include same or similar features and functionalities as computer system 100. Repetitive description of like elements employed in respective embodiments is omitted for sake of brevity.

As shown in FIG. 2, system 200 can include switch fabric arrangement component 216. Switch fabric arrangement component 216 can include various computer-executable components, including, but not limited to arrangement component 202, transformation component 204, waveguide routing component 206, and transposition component 208. Switch fabric arrangement component 216 can also include or otherwise be associated with at least one memory 210 that stores computer-executable components (e.g., arrangement component 202, transformation component 204, waveguide routing component 206, and transposition component 208). Switch fabric arrangement component 216 can also include or otherwise be associated with at least one processor 212 that executes the computer-executable instructions stored in memory 210. Switch fabric arrangement component 216 can further include a system bus 214 that can couple the various components including, but not limited to, arrangement component 202, transformation component 204, waveguide routing component 206, and transposition component 208, memory 210, and/or processor 212.

In some examples, arrangement component 202 can implement similar functionality as arranging module 110. In some examples, transformation component 204 can implement similar functionality as transformation module 112. In some examples, waveguide routing component 206 can implement similar functionality as waveguide routing module 114. In some examples, transposition component 208 can implement similar functionality as transposition module 116.

It should be appreciated that the architecture of system 200 can vary. For example, although various components of system 200 are depicted as being contained within switch fabric arrangement component 216, it can be appreciated that this arrangement is logical rather than indicating that the various components are contained within one device. That is, the various components may be distributed among various computing devices in a networked or distributed computing environment. It may also be appreciated that there may be other suitable architectures that employ more or fewer components than are depicted in system 200. For example, there may be another system that omits transposition component 208.

Figure 3:
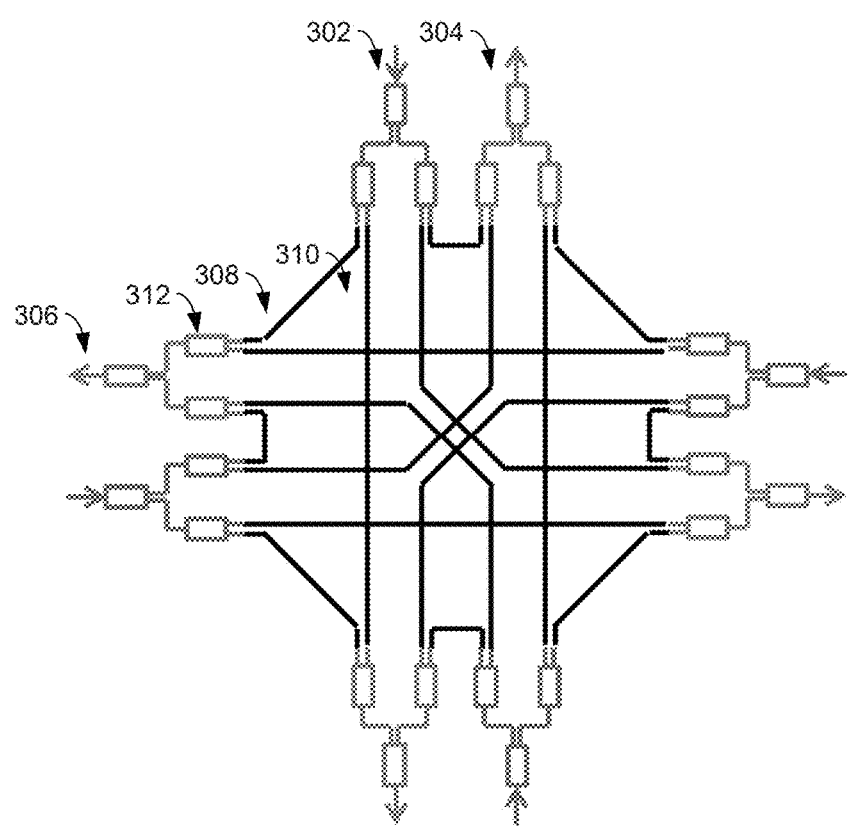
FIG. 3 illustrates a block diagram of an example, non-limiting switch-and-select switch fabric topology in accordance with one or more embodiments described herein.

FIG. 3 illustrates a block diagram of an example, non-limiting switch-and-select switch fabric topology in accordance with one or more embodiments described herein. In fabric topology 300, the topology is laid out with interleaved input and output stages. Fabric topology 300 can be referred to as being a 4×4 topology, because it has four input stages and four output stages. An example of how the input and output stages of fabric topology 300 are interleaved is seen where input stage 302 is interleaved between output stage 304 and output stage 306. As depicted, fabric topology 300 comprises a plurality of elemental switches (sometimes referred to as switches), such as switch 312.

As can be seen, each depicted waveguide has no more than four crossings, with each depicted waveguide having either zero crossings or four crossings. That is, waveguide 308 has zero crossings with other waveguides, and waveguide 310 has four crossings with other waveguides.

In contrast to this fabric topology 300, in a standard 4×4 switch and select topology (sometimes referred to as an active-splitter, active-combiner topology), a waveguide between an input stage and an output stage can have as many as nine crossings with other waveguides. These nine waveguide crossings are significantly higher than the maximum of four waveguide crossings among the waveguides of fabric topology 300.

A standard switch and select topology (sometimes referred to as a S&S topology) can be a strictly non-blocking topology, where each input in an N×N fabric is given a 1×N tree multiplexer, and each output is given a N×1 tree multiplexer. Then, the N outputs of the ith input multiplexer are connected to the ith inputs of the N output multiplexers, creating a massive waveguide shuffle with numerous waveguide crossings. Other examples of switch-and-select fabric topologies that have a reduced number of waveguide crossings relative to a standard switch and select topology are described with respect to FIGS. 4-7.

Figure 4:
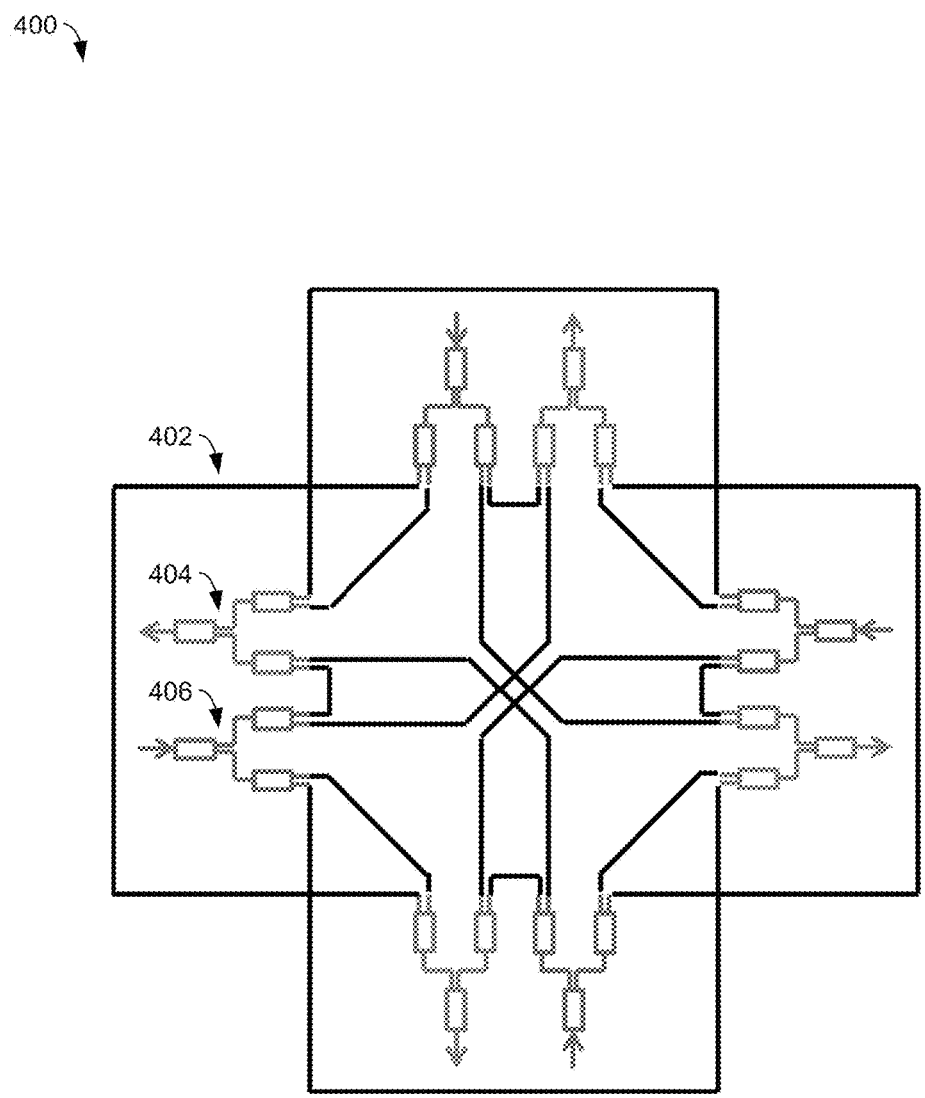
FIG. 4 illustrates a block diagram of another example, non-limiting switch-and-select switch fabric topology in accordance with one or more embodiments described herein.

FIG. 4 illustrates a block diagram of another example, non-limiting switch-and-select switch fabric topology in accordance with one or more embodiments described herein. In fabric topology 400, the topology is laid out with interleaved input and output stages, similar as to fabric topology 300. Fabric topology 400 is also a 4×4 topology, like with fabric topology 300.

In addition to interleaved input and output stages, fabric topology 400 also has interior input and output stages. That is, fabric topology has input and output stages that are interior to a perimeter of fabric topology 400 relative to a waveguide of topology 400. For example, waveguide 402 is exterior to output stage 404 and input stage 406 in topology 400. With these interior input and output stages, each depicted waveguide has no more than two waveguide crossings. These two waveguide crossings are reduced relative to the maximum number of waveguide crossings of fabric topology 300 (four waveguide crossings), and the maximum number of waveguide crossings of a standard switch and select topology (nine waveguide crossings).

Implementing interior input and output stages in a fabric topology can be achieved in a variety of ways. For instance, a fabric topology with interior input and output stages can utilize gratings, angled-facets, and/or 2.5-dimensional waveguide integration.

Figure 5:
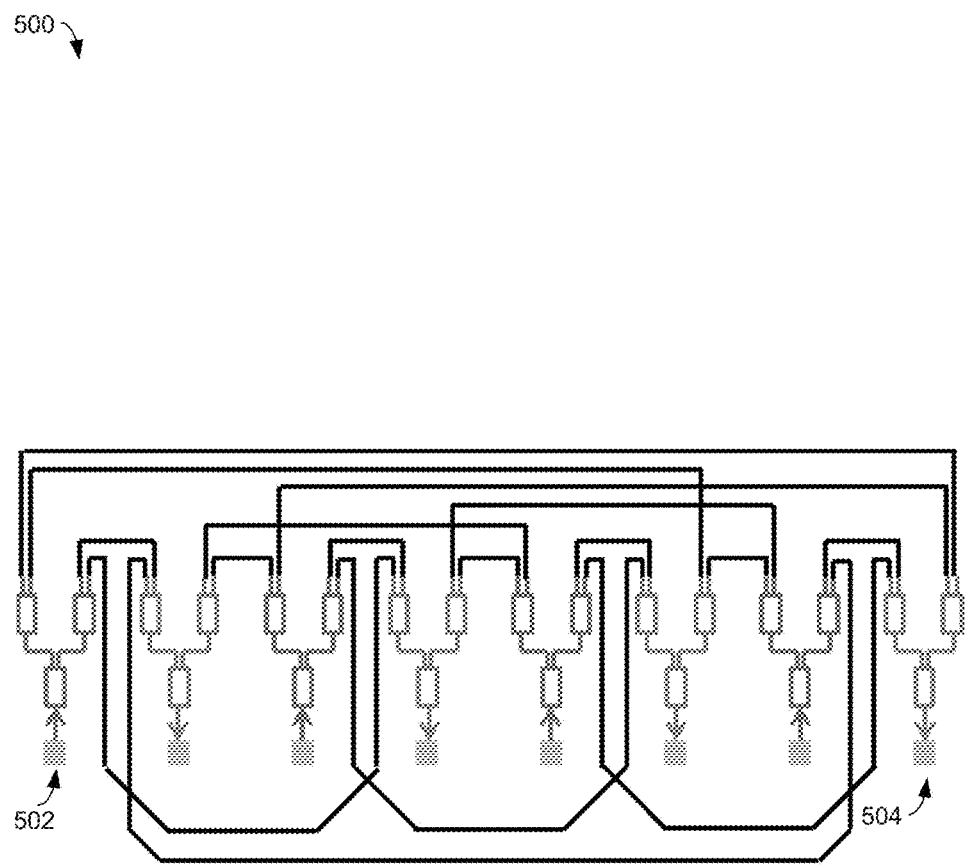
FIG. 5 illustrates a block diagram of another example, non-limiting switch-and-select switch fabric topology in accordance with one or more embodiments described herein.

FIG. 5 illustrates a block diagram of another example, non-limiting switch-and-select switch fabric topology in accordance with one or more embodiments described herein. Fabric topology 500 is similar to fabric topology 400 in that both fabric topologies implement interleaved input and output stages, as well as interior input and output stages.

Relative to, and in contrast to fabric topology 400, in fabric topology 500 input and output stages are rearranged so as to interface to a linear fiber array. For example, as can be seen in fabric topology 500, both input stage 502 and output stage 504 are arranged in a line, so as to interface to a linear fiber array. As depicted, each depicted waveguide has no more than two waveguide crossings, which is the same as in fabric topology 400, and which is reduced relative to both fabric topology 300 and a standard switch and select topology.

Figure 6:
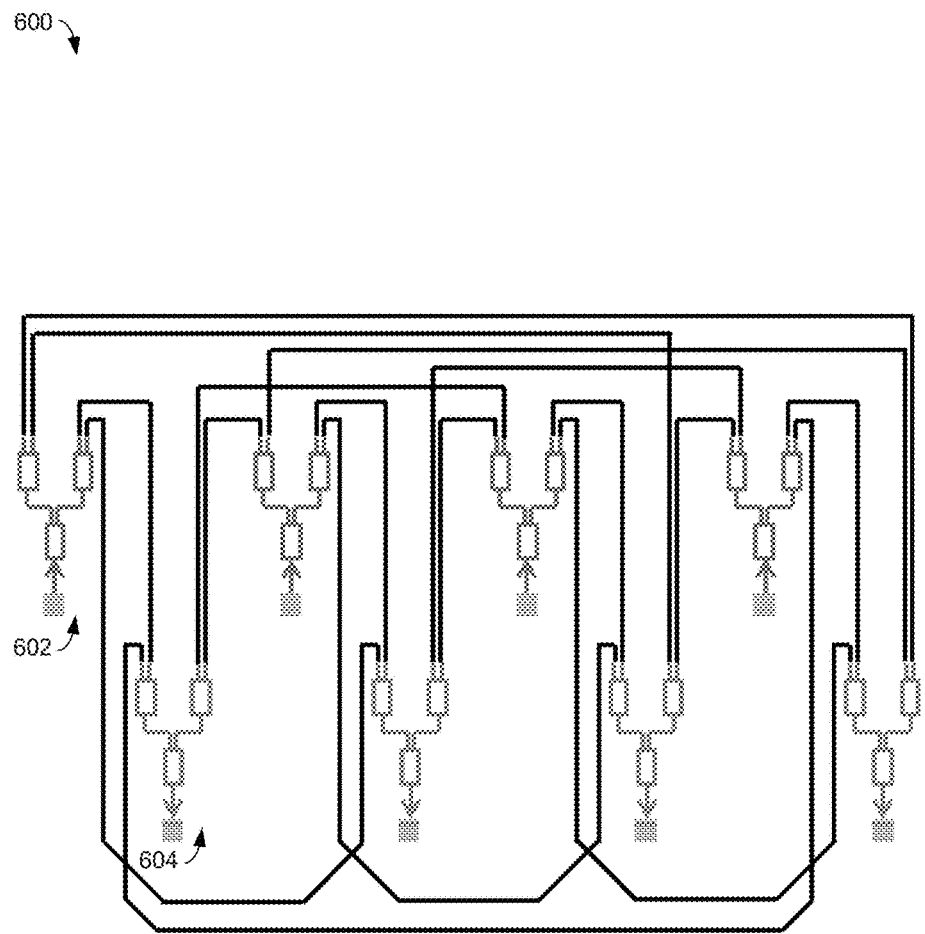
FIG. 6 illustrates a block diagram of another example, non-limiting switch-and-select switch fabric topology in accordance with one or more embodiments described herein.

FIG. 6 illustrates a block diagram of another example, non-limiting switch-and-select switch fabric topology in accordance with one or more embodiments described herein. Fabric topology is similar to fabric topology 500 in that both fabric topologies implement interleaved input and output stages, as well as interior input and output stages. Whereas fabric topology 500 implements the input stages and output stages linearly, in fabric topology 600 there are two linear arrangements—the input stages (which includes input stage 602) are implemented in one linear arrangement, and the output stages (which includes output stage 604) are implemented in another linear arrangement.

As depicted, each depicted waveguide has no more than two waveguide crossings, which is the same as in fabric topology 500 and fabric topology 400, and which is reduced relative to both fabric topology 300 and a standard switch and select topology.

Figure 7:
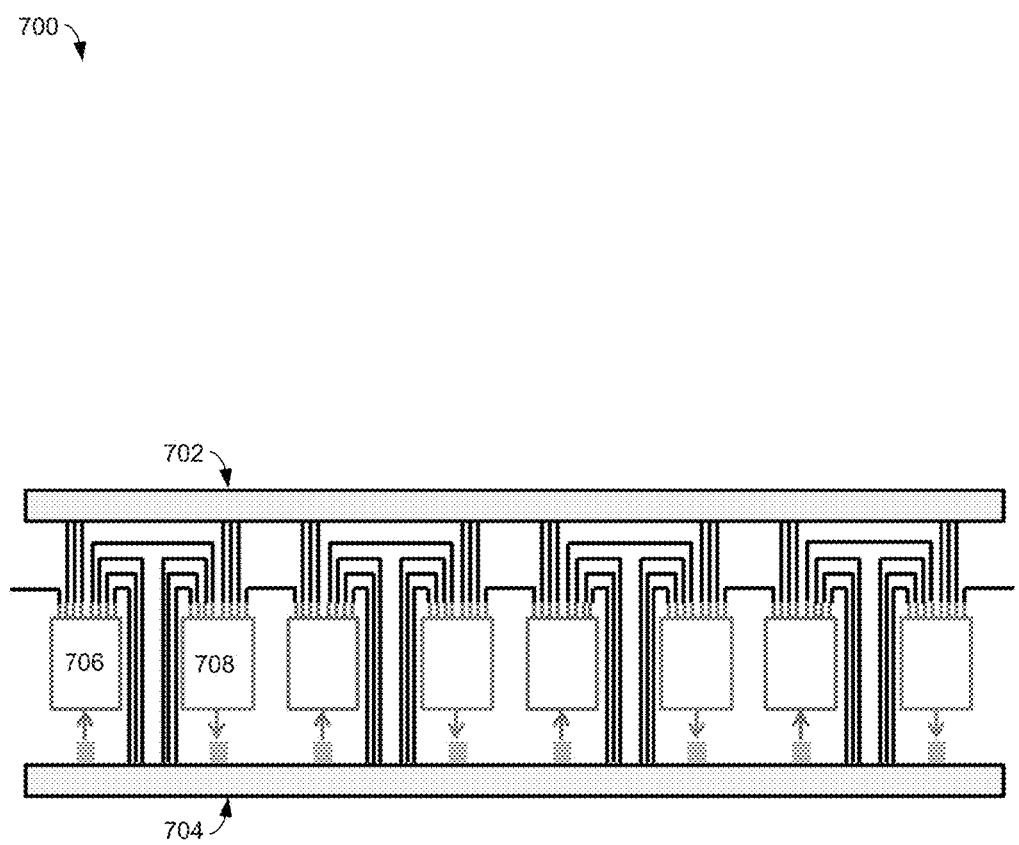
FIG. 7 illustrates a block diagram of another example, non-limiting switch-and-select switch fabric topology in accordance with one or more embodiments described herein.

FIG. 7 illustrates a block diagram of another example, non-limiting switch-and-select switch fabric topology in accordance with one or more embodiments described herein. Fabric topology 700 implements two waveguide shuffles (waveguide shuffle 702, and waveguide shuffle 704). A waveguide shuffle provides a static interconnection between each of a plurality of input waveguides and each of a plurality of output waveguides.

Fabric topology 700 also implements a number of input and output stages. As depicted, each input stage (such as input stage 706) can be referred to as being "1×N" because it takes one input and feeds that to 1 of N different output waveguides. Additionally, each output stage (such as output stage 708) can be referred to as being "N×1" because it takes a signal from 1 of N waveguides and feeds that to one output. As depicted, there are a maximum number of $0.25N^2-0.5N$ waveguide crossings in any path in the waveguides of fabric topology 700, which are contained in waveguide shuffle 702 and waveguide shuffle 704 ( ).

More generally, a fabric topology that utilizes waveguides, such as fabric topology 700, can have its waveguide assignments specified as follows. Using a N×N fabric topology, each waveguide shuffle can have $(N/2-1)*N$ inputs and $(N/2-1)*N$ outputs. Then, as above, a maximum number of waveguide crossings for a waveguide can be expressed as $0.25N^2-0.5N$. This number of waveguide crossings in a fabric topology like fabric topology 700 can be seen in contrast to a larger number of maximum waveguide crossings in a standard switch and select topology, which can be expressed as $(N-1)^2$.

A waveguide assignment between input and output stages in a topology such as fabric topology 700 can be expressed as follows. In the following assignments, $O_{x,y}$ refers to an output stage identified among output stages as x, with the output stage's particular output among its plurality of outputs being identified as y. Then, in the following assignments, $I_{x,y}$ refers to an input stage identified among input stages as x, with the output stage's particular output among its plurality of outputs being identified as y. As such, waveguide assignments from O(1×N)→I(N×1) can be expressed as:

$O_{(1),(i)} \rightarrow I_{(N),(k)}$
$O_{(2),(i)} \rightarrow I_{(N-1),(k+1)}$
. . .
$O_{(N/2),(i)} \rightarrow I_{(N/2+1),(k+N/2)}$
$O_{(N/2+1),(i)} \rightarrow I_{(N/2),(k-1)}$
. . .
$O_{(N),(i)} \rightarrow I_{(1),(k-N/2)}.$ Using these techniques as applied to switch and select topologies, a 4×4 switch and select topology can have 9 waveguide crossings in a standard configuration; 4 waveguide crossings with interleaved inputs and outputs; and 2 waveguide crossings with interleaved and interior inputs and outputs. An 8×8 switch and select topology can have 49 waveguide crossings in a standard configuration; 24 waveguide crossings with interleaved inputs and outputs; and 12 waveguide crossings with interleaved and interior inputs and outputs. A 16×16 switch and select topology can have 225 waveguide crossings in a standard configuration; 128 waveguide crossings with interleaved inputs and outputs; and 56 waveguide crossings with interleaved and interior inputs and outputs. A 32×32 switch and select topology can have 961 waveguide crossings in a standard configuration; 480 waveguide crossings with interleaved inputs and outputs; and 240 waveguide crossings with interleaved and interior inputs and outputs. A 64×64 switch and select topology can have 3,969 waveguide crossings in a standard configuration; 1,984 waveguide crossings with interleaved inputs and outputs; and 992 waveguide crossings with interleaved and interior inputs and outputs. A generalized N×N switch and select topology can have $(N-1)^2$ waveguide crossings in a standard configuration; $(\frac{1}{2})N^2-N$ waveguide crossings with interleaved inputs and outputs; and $(\frac{1}{4})N^2-(\frac{1}{2})N$ waveguide crossings with interleaved and interior inputs and outputs.

Figure 8:
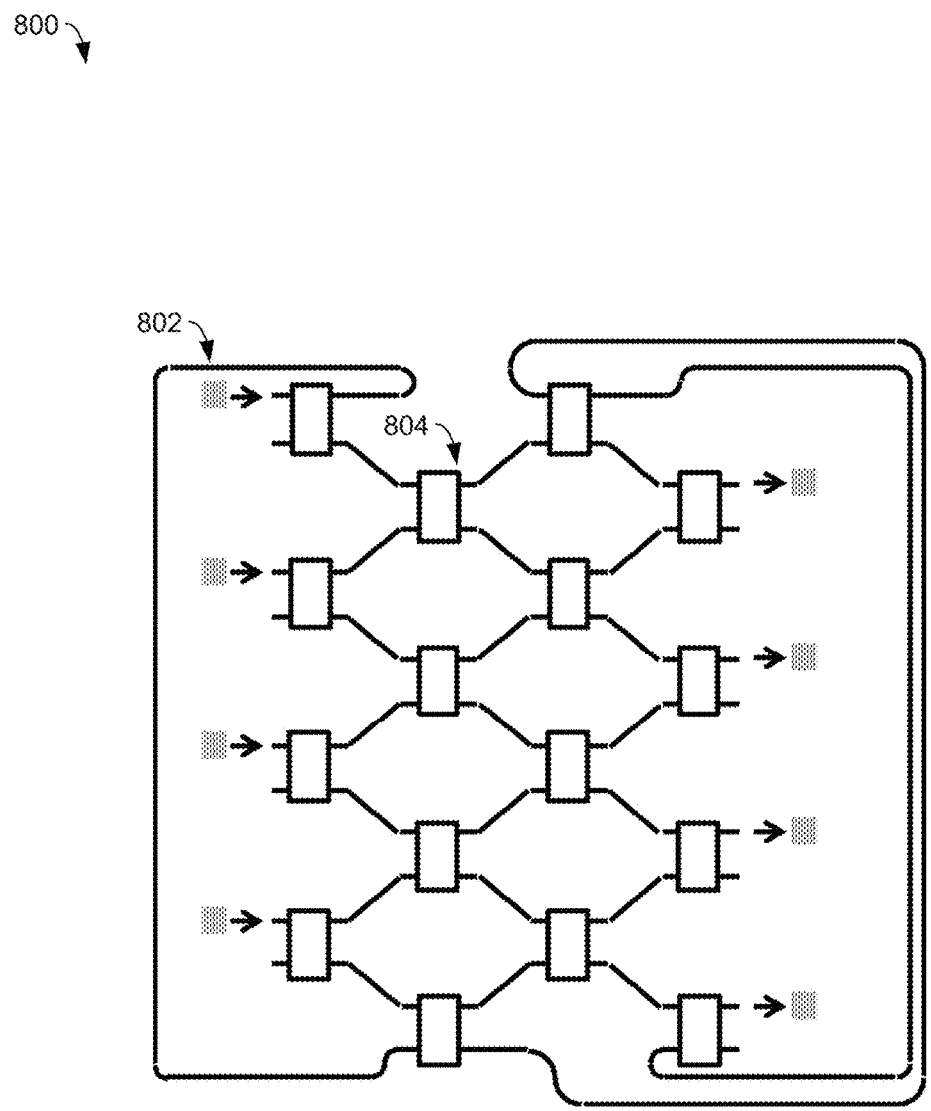
FIG. 8 illustrates a block diagram of an example, non-limiting path-independent insertion-loss (PILOSS) network switch fabric topology in accordance with one or more embodiments described herein.

FIG. 8 illustrates a block diagram of an example, non-limiting PILOSS network switch fabric topology in accordance with one or more embodiments described herein. Switch fabric 800 is a 4×4 PILOSS network with no waveguide crossings. For example, waveguide 802 has no waveguide crossings. Switch fabric 800 contains a plurality of switches, such as switch 804, which are able to switch a signal received to be output on another of the waveguides to which the switch is connected. Switch fabric 800 has interior-accessible input and output stages, by wrapping edge-to-edge connecting waveguides of a Spanke-Benes network around a perimeter of switch fabric 800.

Figure 9:
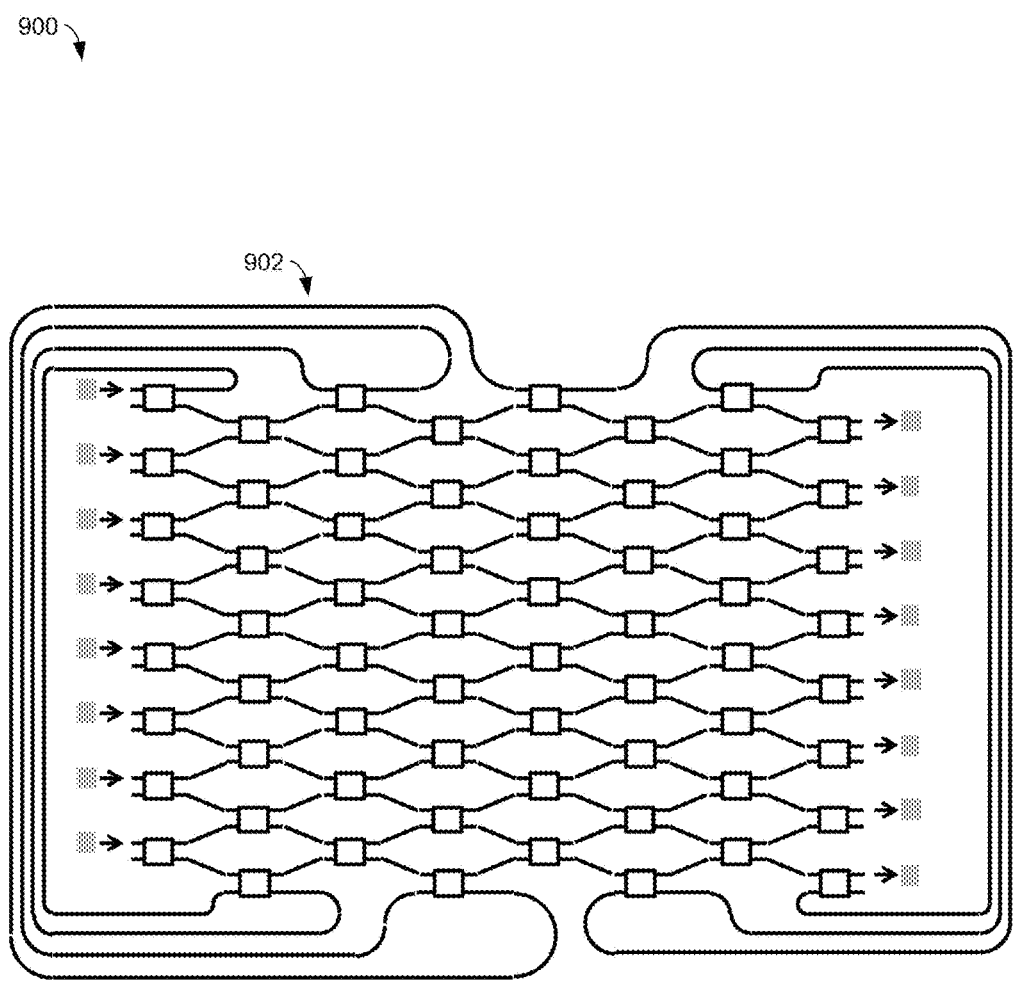
FIG. 9 illustrates a block diagram of another example, non-limiting PILOSS network switch fabric topology in accordance with one or more embodiments described herein.

FIG. 9 illustrates a block diagram of another example, non-limiting PILOSS network switch fabric topology in accordance with one or more embodiments described herein. Switch fabric 900 extends the principles of the 4×4 PILOSS network of switch fabric 800, and applies them to an 8×8 PILOSS network. As can be seen, just as with switch fabric 800, there are no waveguide crossings among the waveguides of switch fabric 900 (such as with waveguide 902).

Figure 10:
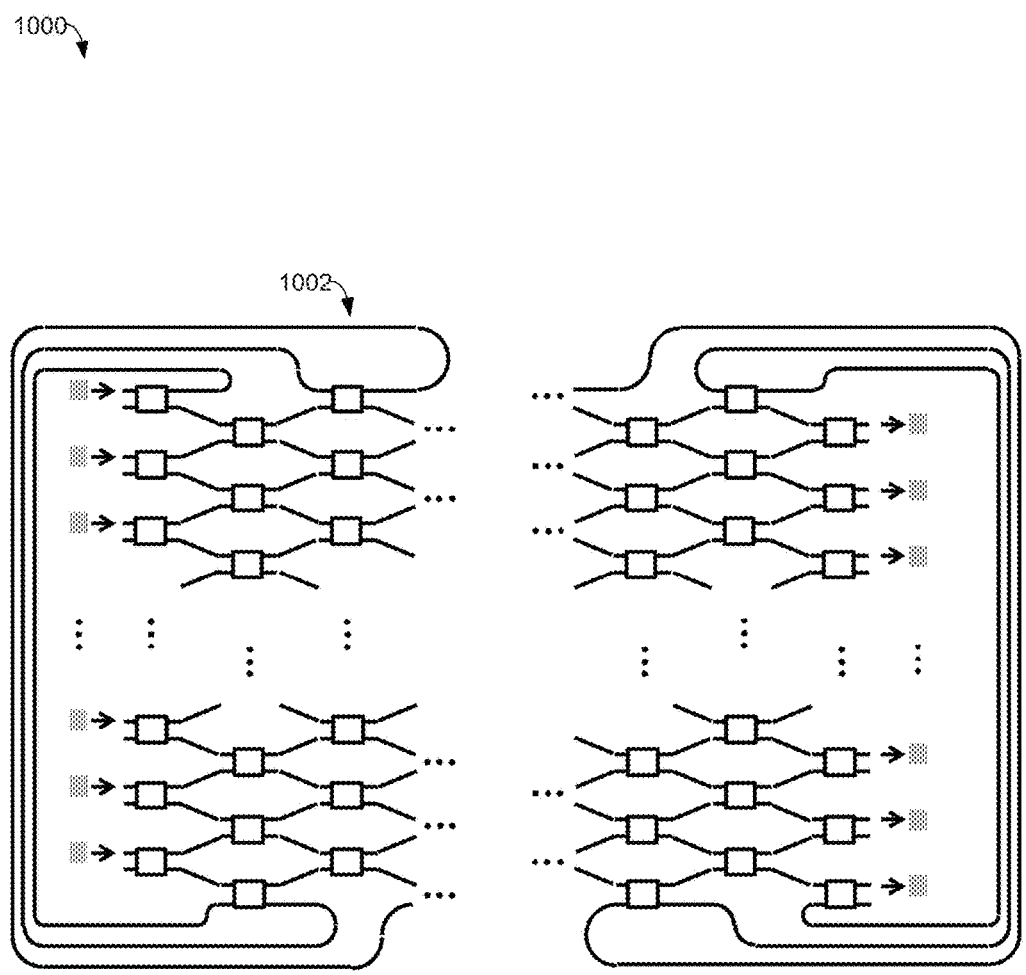
FIG. 10 illustrates a block diagram of another example, non-limiting PILOSS network switch fabric topology in accordance with one or more embodiments described herein.

FIG. 10 illustrates a block diagram of another example, non-limiting PILOSS network switch fabric topology in accordance with one or more embodiments described herein. Switch fabric 1000 extends the principles of the 4×4 PILOSS network of switch fabric 800, and the 8×8 PILOSS network of switch fabric 900, to a N×N PILOSS network. As can be seen, just as with switch fabric 800 and switch fabric 900, there are no waveguide crossings among the waveguides of switch fabric 1000 (such as with waveguide 1002). That is, compared to a standard N×N PILOSS network, a number of waveguide crossings is reduced from N−1 to zero.

Figure 11:
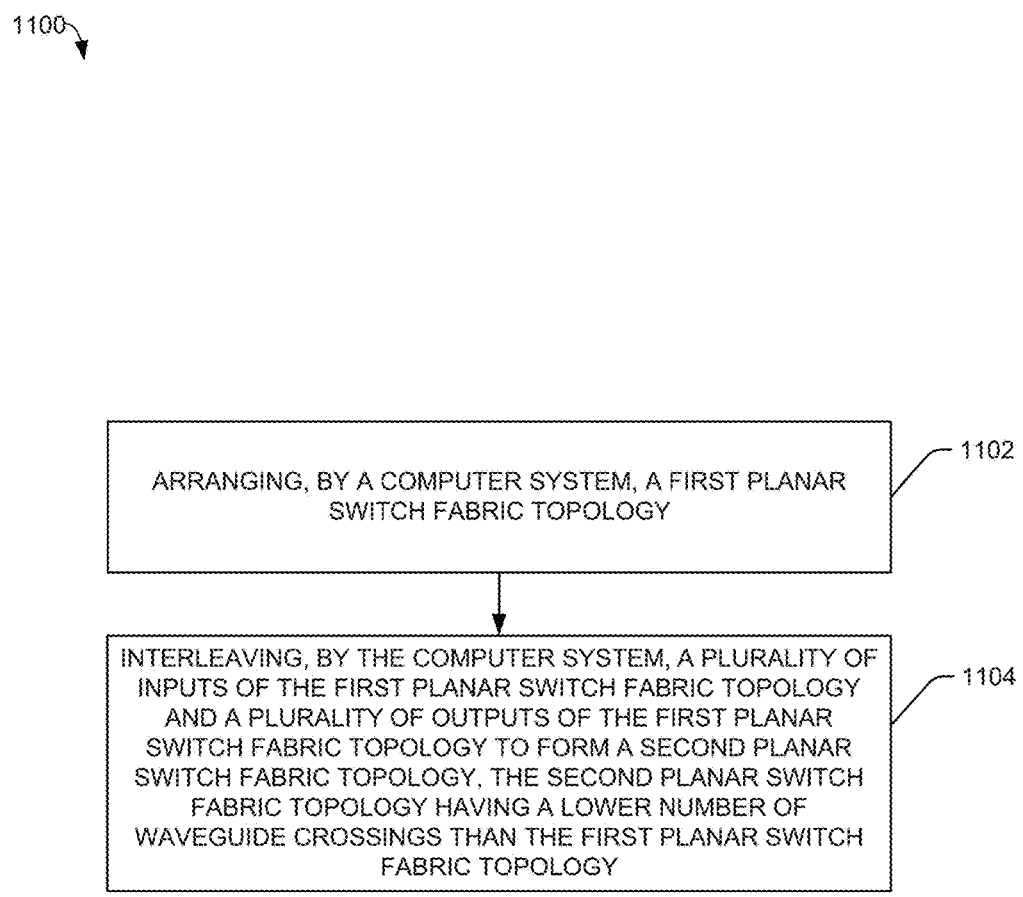
FIG. 11 illustrates a flow diagram of an example, non-limiting computer-implemented method that facilitates implementing planar photonic switch fabrics with reduced waveguide crossings, in accordance with one or more embodiments described herein.

FIG. 11 illustrates a flow diagram of an example, non-limiting computer-implemented method that facilitates implementing planar photonic switch fabrics with reduced waveguide crossings, in accordance with one or more embodiments described herein. In some examples, flow diagram 1100 can be implemented by computing system 100 or computing system 200. It can be appreciated that the operations of flow diagram 1100 are an example, and that there can be embodiments that implement more or fewer operations than are depicted, or that implement the depicted operations in a different order than is depicted. Flow diagram 1100 can be implemented, for example, to reduce waveguide crossings in a planar photonic switch fabric by interleaving input and output stages.

Operation 1102 depicts arranging, by a computer system (e.g., computer system 100 or computer system 200), a first planar switch fabric topology. Arranging a first planar switch topology can comprise arranging a standard switch fabric topology, such as a standard switch and select fabric topology, or a standard PILOSS fabric topology, and then modifying this topology in operation 1104 to reduce a number of waveguide crossings. In some examples, the first planar switch fabric topology comprises a switch and select topology. An example of a switch and select topology is depicted and described with respect to FIG. 4. In some examples, the first planar switch fabric topology comprises a fat-tree topology. A fat-tree topology can generally comprise a topology where, for a given switch, a number of links going down to its siblings is equal to a number of links going up to its parent.

Operation 1104 depicts interleaving, by a computer system (e.g., computer system 100 or computer system 200), a plurality of inputs of the first planar switch fabric topology and a plurality of outputs of the first planar switch fabric topology to form a second planar switch fabric topology, the second planar switch fabric topology having a lower number of waveguide crossings than the first planar switch fabric topology. Examples of interleaving inputs and outputs are shown and described with respect to FIGS. 3-7.

In some examples, operation 1104 comprises arranging, by a computer system (e.g., computer system 100 or computer system 200), plurality of inputs and the plurality of outputs into a linear array in the second planar switch fabric topology. An example of such an arrangement is shown and described with respect to FIG. 5.

In some examples, operation 1104 comprises arranging, by a computer system (e.g., computer system 100 or computer system 200), the plurality of inputs into a first linear array in the second planar switch fabric topology; and arranging the plurality of outputs into a second linear array in the second planar switch fabric topology. An example of such an arrangement is shown and described with respect to FIG. 6.

In some examples, operation 1104 comprises arranging, by a computer system (e.g., computer system 100 or computer system 200), the plurality of inputs and the plurality of outputs of the second planar switch fabric topology in a two-dimensional array matching to a two-dimensional arrangement of cores within a multicore fiber. A multicore fiber can generally include multiple fiber channels within a fiber cable.

In some examples, operation 1104 comprises routing, by a computer system (e.g., computer system 100 or computer system 200), a first waveguide of the first planar switch fabric topology around a perimeter of a first input of the plurality of inputs to produce the second planar switch fabric topology, the first input being located on an interior of the second planar switch fabric topology. Examples of such routing are shown and described with respect to FIGS. 4 and 12.

In some examples, operation 1104 comprises routing, by a computer system (e.g., computer system 100 or computer system 200), a first waveguide of the first planar switch fabric topology around a perimeter of a first output of the plurality of inputs to produce the second planar switch fabric topology, the first output being located on an interior of the second planar switch fabric topology. Examples of such routing are shown and described with respect to FIGS. 4 and 12.

Figure 12:
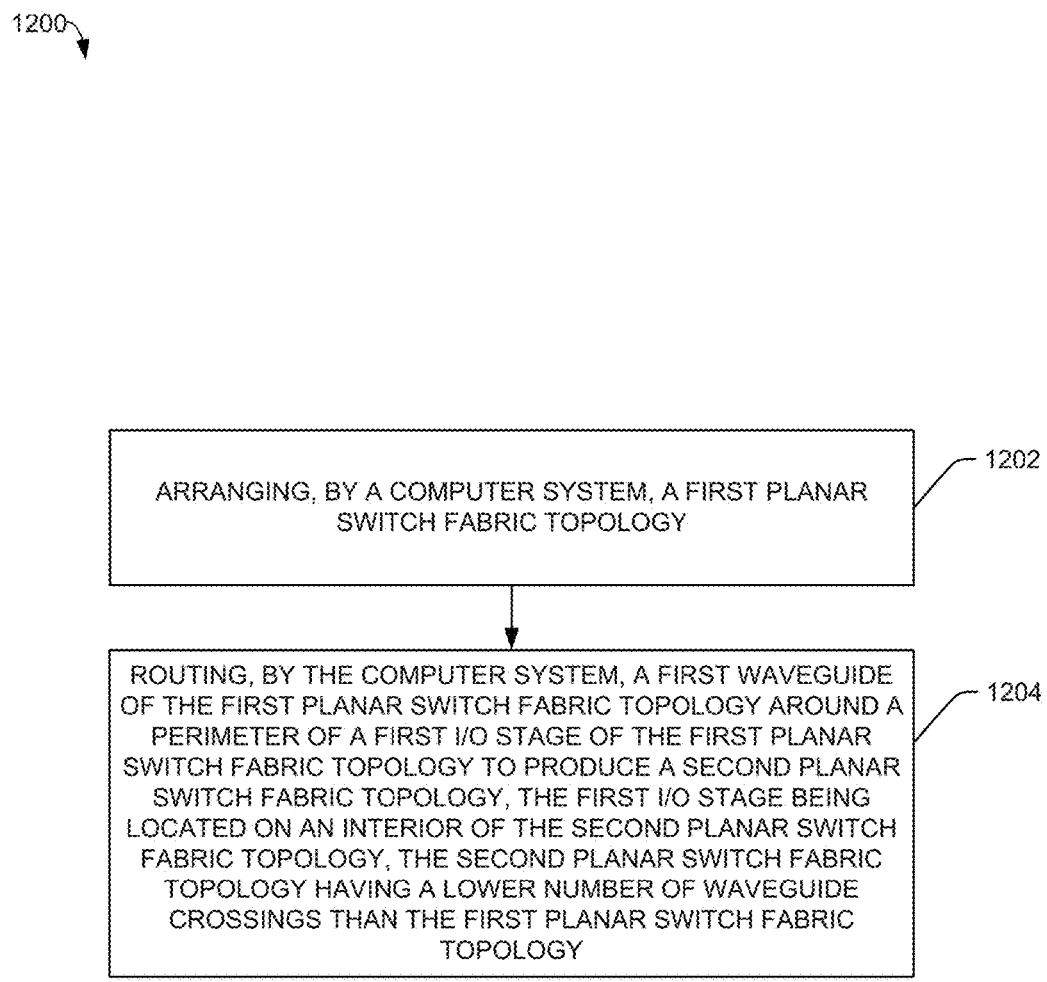
FIG. 12 illustrates another flow diagram of an example, non-limiting computer-implemented method that facilitates implementing planar photonic switch fabrics with reduced waveguide crossings, in accordance with one or more embodiments described herein.

FIG. 12 illustrates another flow diagram of an example, non-limiting computer-implemented method that facilitates implementing planar photonic switch fabrics with reduced waveguide crossings, in accordance with one or more embodiments described herein. In some examples, flow diagram 1200 can be implemented by computing system 100 or computing system 200. It can be appreciated that the operations of flow diagram 1200 are an example, and that there can be embodiments that implement more or fewer operations than are depicted, or that implement the depicted operations in a different order than is depicted. Flow diagram 1200 can be implemented, for example, to reduce waveguide crossings in a planar photonic switch fabric by routing a waveguide around a perimeter of a switch fabric, thus orienting an input and/or an output stage on an interior of the switch fabric.

Operation 1202 depicts arranging, by a computer system (e.g., computer system 100 or computer system 200), a first planar switch fabric topology. In some examples, operation 1202 can be implemented in a similar manner as operation 1102.

Operation 1204 depicts routing, by a computer system (e.g., computer system 100 or computer system 200), a first waveguide of the first planar switch fabric topology around a perimeter of a first I/O stage of the first planar switch fabric topology to produce a second planar switch fabric topology, the first I/O stage being located on an interior of the second planar switch fabric topology, the second planar switch fabric topology having a lower number of waveguide crossings than the first planar switch fabric topology. An example of such an arrangement is shown and described with respect to FIG. 4.

In some examples, the first I/O stage comprises an input stage, such as input stage 406 of FIG. 4. In some examples, the first I/O stage comprises an output stage, such as output stage 404 of FIG. 4.

In some examples, a signal, input, or lightwave is injected into the first I/O stage of a top side of the second planar switch fabric topology. A planar switch fabric topology, being approximately planar in shape, can be considered to have a top side and a back side. In some examples, operation 1204 comprises injecting, by a computer system (e.g., computer system 100 or computer system 200), a signal, input, or lightwave into the first I/O stage of a back side of the second planar switch fabric topology. A signal, input, or lightwave can comprise a way of expressing data that is transmitted via a planar photonic switch fabric.

In some examples, a signal, input, or lightwave is injected into the first I/O stage of the second planar switch fabric topology using a second waveguide located on a separate planar layer as the first waveguide. A planar photonic switch fabric can comprise multiple planar layers. In these examples, various I/O stages and waveguides can be implemented in different planar layers of a planar photonic switch fabric.

In some examples, a signal, input, or lightwave is injected into the first I/O stage of the second planar switch fabric topology using an out of plane coupling structure. An out of plane coupling structure can generally comprise a coupling structure (which generally couples light to or from a waveguide) that extends beyond a roughly planar shape formed by the fabric topology. In some examples, the out of plane coupling structure comprises a grating coupler. A grating coupler can generally comprise notching a waveguide into a diffraction grating so that light is diffracted off the notches and constructively interferes toward an optical fiber.

In some examples, the out of plane coupling structure comprises an angled reflective surface. An angled reflective surface can generally comprise a surface that both reflects light and that is angled so as to direct reflected light toward an optical fiber.

In some examples, a first layer of the second planar switch fabric topology is fabricated in a silicon layer, and a second layer of the second planar switch fabric topology that comprises a second waveguide is fabricated in silicon nitride. Other such material pairings can include silicon and silicon, silicon and amorphous silicon, and silicon and a polymer.

In some examples, a first layer of the second planar switch fabric topology is fabricated in an indium phosphide layer, and a second layer of the second planar switch fabric topology that comprises a second waveguide is fabricated in silicon nitride. Other such material pairings can include indium phosphide and amorphous silicon, and gallium arsenide and amorphous silicon.

In some examples, operation 1204 comprises injecting, by a computer system (e.g., computer system 100 or computer system 200), a signal, input, or lightwave into the first I/O stage of the second planar switch fabric topology using a layer of planar optical waveguides. A planar optical waveguide can generally comprise an optical waveguide with a planar geometry, which guides light in one dimension. A planar optical waveguide can generally be fabricated as a thin transparent film on a substrate, or embedded between two substrate layers.

In some examples, the second planar switch fabric topology comprises a data transmitting optical emitter that is integrated within an interior of the second planar switch fabric topology. A data transmitting optical emitter can generally comprise a structure that emits data encoded as light pulses. In some examples, the second planar switch fabric topology comprises a data receiving optical detector that is integrated within an interior of the second planar switch fabric topology. A data receiving optical detector can generally comprise a structure that receives data encoded as light pulses.

Figure 13:
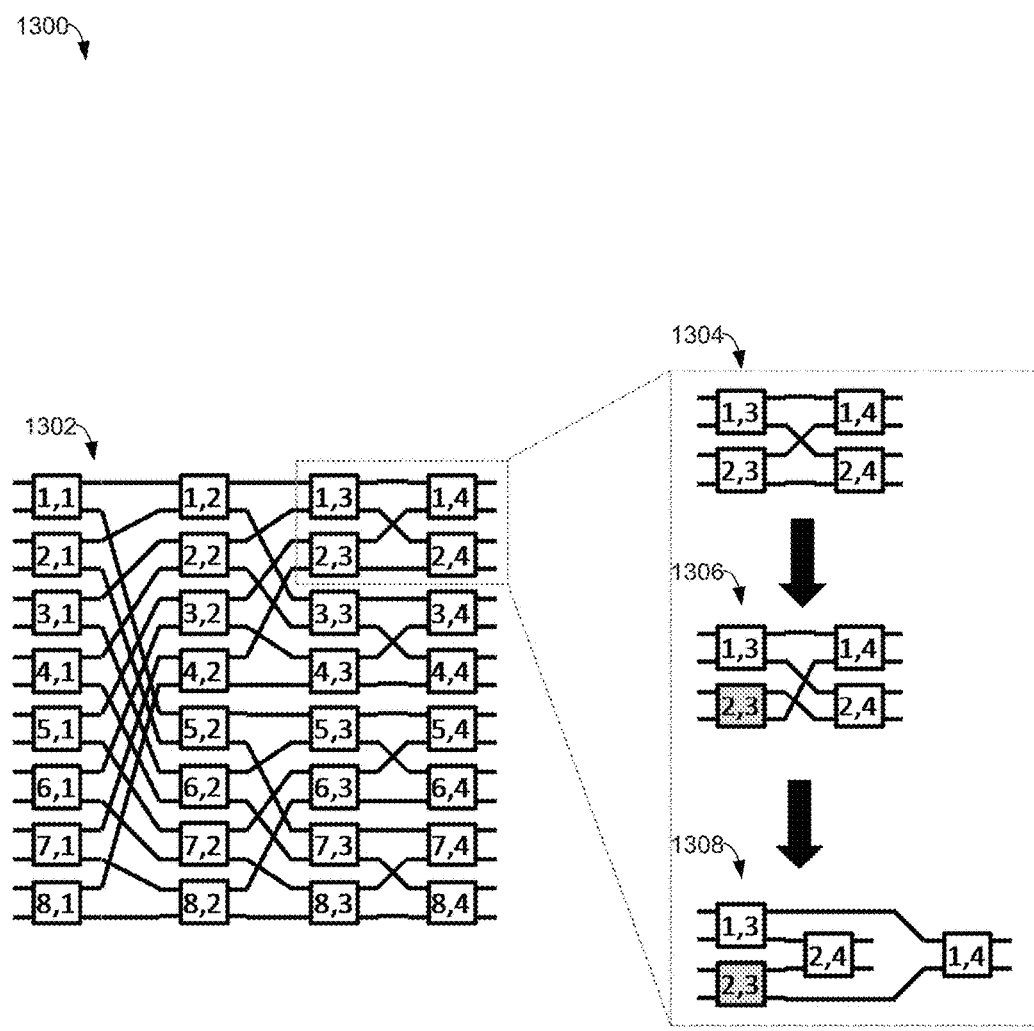
FIG. 13 illustrates a block diagram of an example, non-limiting butterfly network switch fabric topology in accordance with one or more embodiments described herein.

FIG. 13 illustrates a block diagram of an example, non-limiting butterfly network switch fabric topology in accordance with one or more embodiments described herein. Butterfly network 1300 comprises a butterfly network 1302, along with various permutations of a subsection of butterfly network 1302 as it is rearranged to reduce a number of waveguide crossings—butterfly network subsection 1304, butterfly network subsection 1306, and butterfly network subsection 1308. Butterfly network subsection 1304 is the same as a corresponding subsection of butterfly network 1302. Then, from butterfly network subsection 1304 to butterfly network subsection 1306, two waveguides are rearranged such that the output port connections of switch (2,3) are exchanged. Then, from butterfly network subsection 1306 to butterfly network subsection 1308, the placement of two switches is moved, so as to reduce a number of waveguide crossings from two in butterfly network subsection 1306 to zero in butterfly network subsection 1308.

This approach depicted in FIG. 13 can be stated more formally. Here, a step is to nest each of the ith switches (for even values of i) in a final stage of switches in between input waveguides to the (i−1)th switch in the same stage by interchanging the output connections of the ith switch in the second-to-last stage. In FIG. 13, this approach involves rewiring a switch, with output ports crossed, and this can be accomplished by introducing a pi phase shift into one arm of a Mach Zehnder switch, or by flipping a logical bit of a drive signal.

Figure 14:
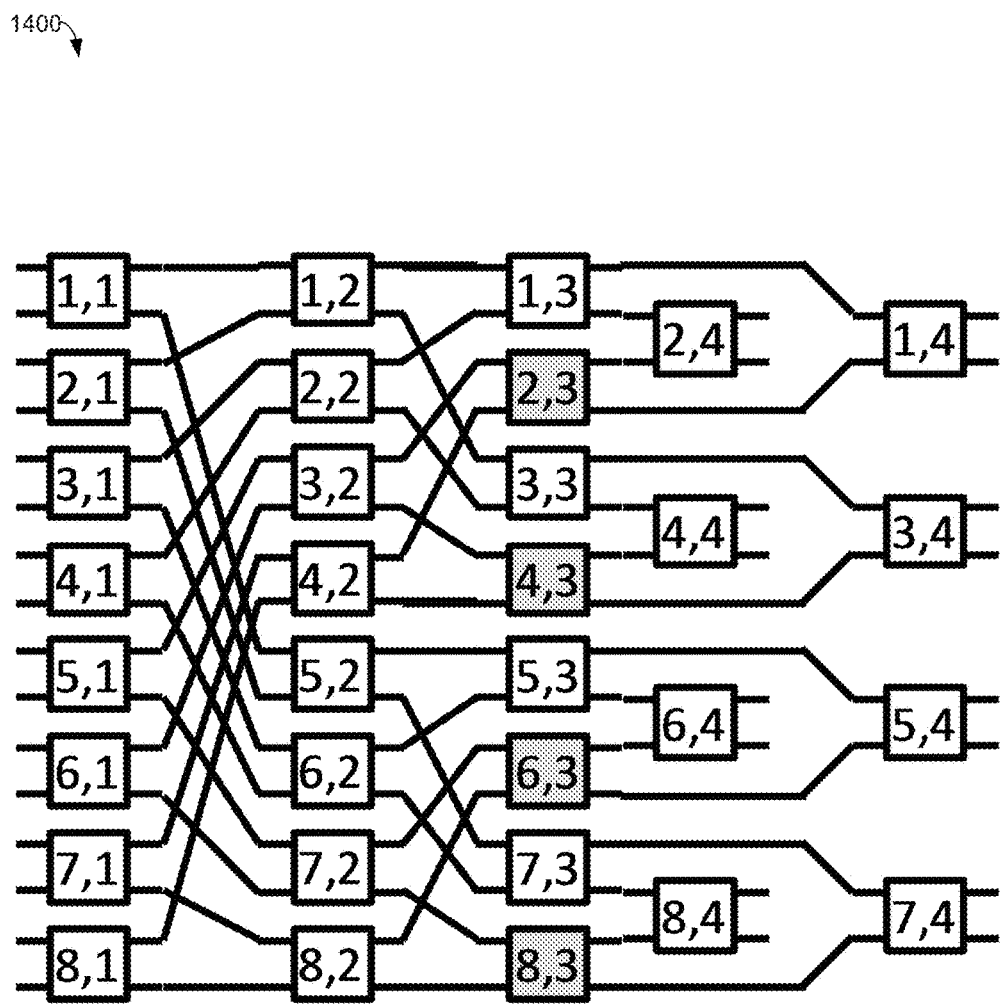
FIG. 14 illustrates a block diagram of another example, non-limiting butterfly network switch fabric topology in accordance with one or more embodiments described herein.

FIG. 14 illustrates a block diagram of another example, non-limiting butterfly network switch fabric topology in accordance with one or more embodiments described herein. Butterfly network 1400 represents a transformation of butterfly network 1302, after the approach described with respect to FIG. 13 is applied in full, as opposed to applied to part of the butterfly network, as shown in butterfly network subsection 1308.

Figure 15:
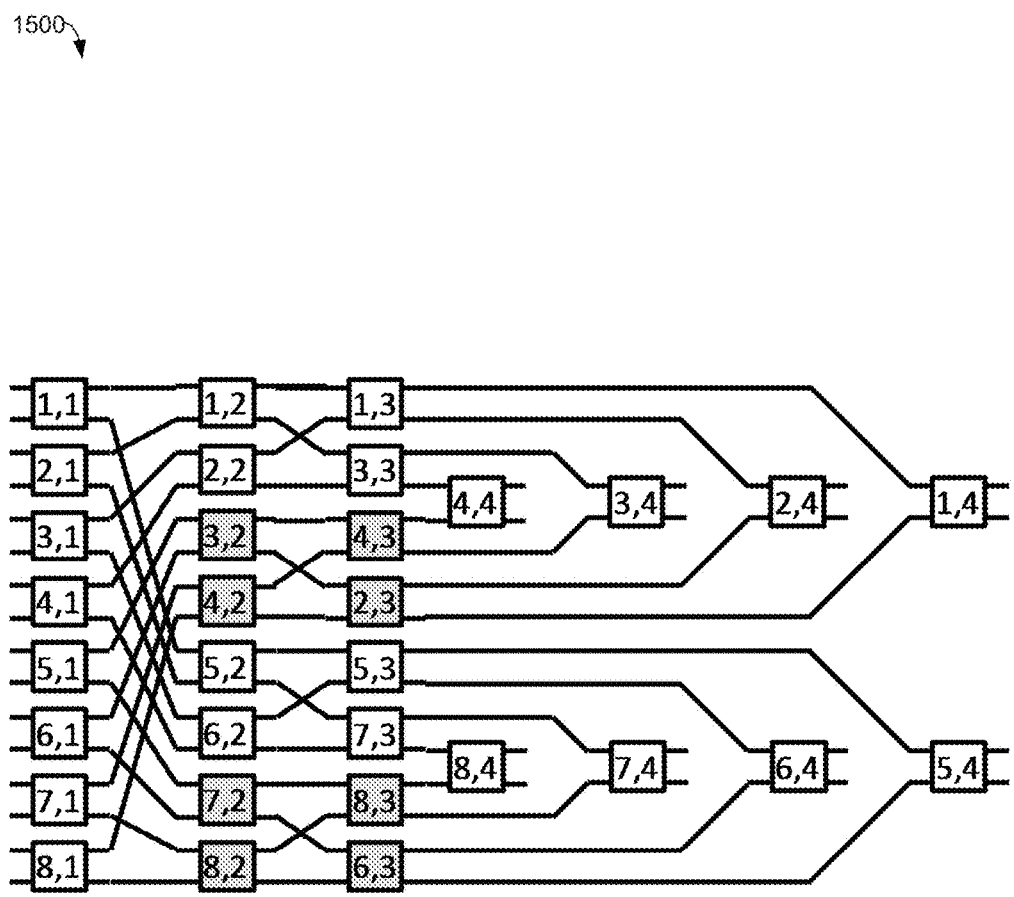
FIG. 15 illustrates a block diagram of another example, non-limiting butterfly network switch fabric topology in accordance with one or more embodiments described herein.

FIG. 15 illustrates a block diagram of another example, non-limiting butterfly network switch fabric topology in accordance with one or more embodiments described herein. Butterfly network 1500 shows a further arrangement of the switches of a butterfly network, continuing from butterfly network 1400 (and butterfly network 1302). Here, as depicted with butterfly network 1400, another step is performed.

As between butterfly network 1500 and butterfly network 1400, each of the ith and (i−1)th switches (where i is a multiple of four) are nested, for switches existing in the last stage of switches of a switch fabric, and subsequent connections to those switches, in between input waveguides of the (i−2)th and (i−3)th switch in the same stage by interchanging the output connections of the ith and (i−1)th switches in the third-to-last stage of the fabric.

Figure 16:
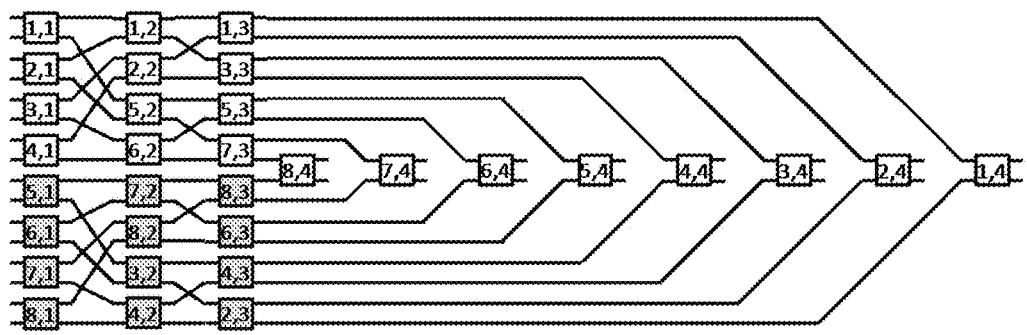
FIG. 16 illustrates a block diagram of another example, non-limiting butterfly network switch fabric topology in accordance with one or more embodiments described herein.

FIG. 16 illustrates a block diagram of another example, non-limiting butterfly network switch fabric topology in accordance with one or more embodiments described herein. Butterfly network 1600 continues the approach of butterfly network 1500. Here, as depicted with butterfly network 1500, another step is performed in reducing a number of waveguide crossings in a butterfly network.

In butterfly network 1600, a step has been performed of nesting each of the ith, (i−1th), (i−2th), and (i−3)th switches (for i being a multiple of 8) existing in the last stage of switches, as well as subsequent connections to those switches, in between the input waveguides of the (i−4)th, (i−5)th, (i−6)th and (i−7)th switch in the same stage by interchanging the output connections of the ith, (i−1)th, (i−2)th, and (i−3)th switches in the fourth-to-last stage of the butterfly network. In an additional step, this pattern is continued until the output ports of the switches within the first stage have been interchanged.

Figure 17:
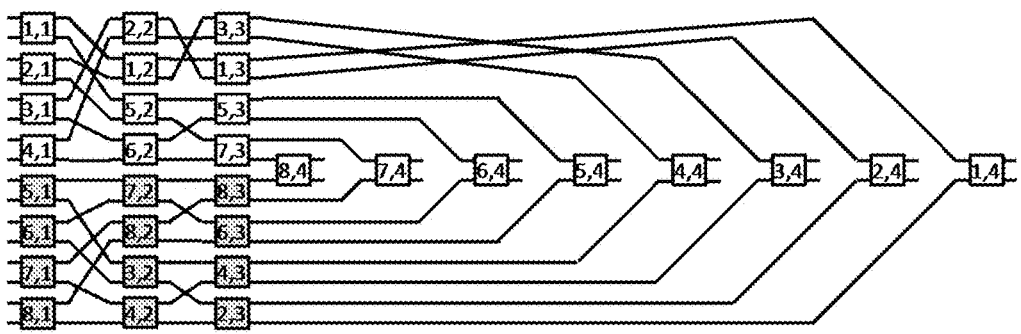
FIG. 17 illustrates a block diagram of another example, non-limiting butterfly network switch fabric topology in accordance with one or more embodiments described herein.

FIG. 17 illustrates a block diagram of another example, non-limiting butterfly network switch fabric topology in accordance with one or more embodiments described herein. Butterfly network 1700 continues the approach of butterfly network 1600. Here, as depicted with butterfly network 1700, another step is performed in reducing a number of waveguide crossings in a butterfly network, similar to as described with respect to FIG. 16.

Figure 18:
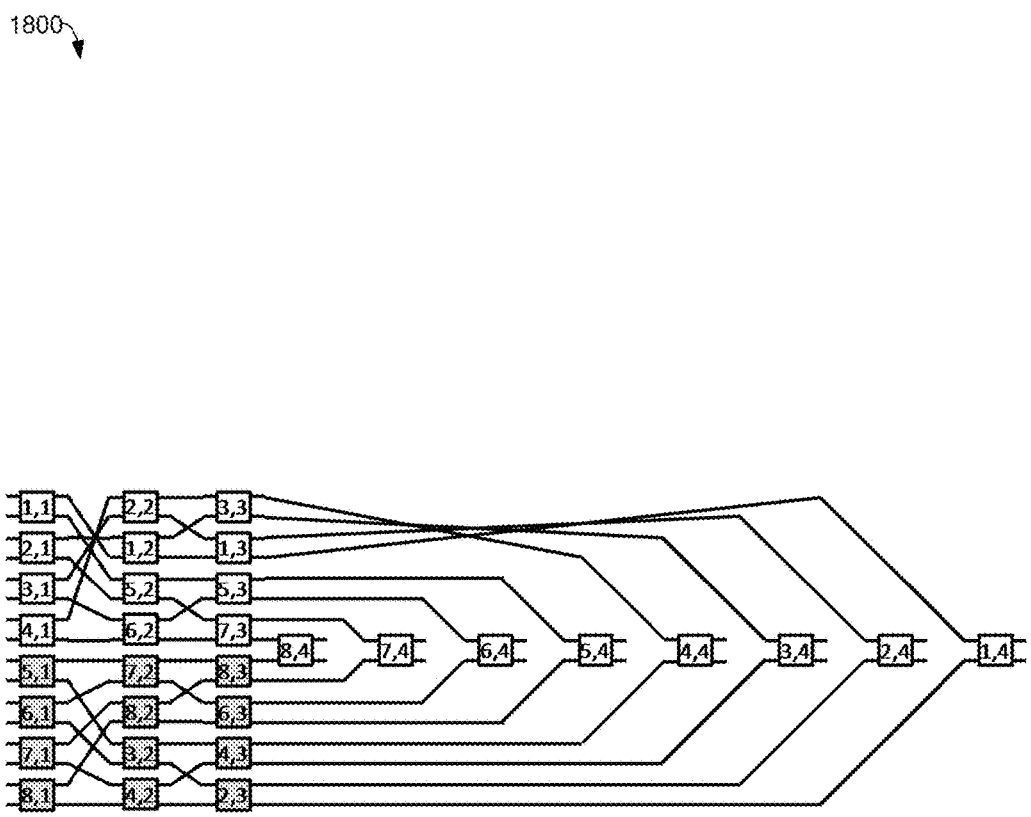
FIG. 18 illustrates a block diagram of another example, non-limiting butterfly network switch fabric topology in accordance with one or more embodiments described herein.

FIG. 18 illustrates a block diagram of another example, non-limiting butterfly network switch fabric topology in accordance with one or more embodiments described herein. Butterfly network 1800 continues the approach of butterfly network 1700. Here, as depicted with butterfly network 1800, another step is performed in reducing a number of waveguide crossings in a butterfly network, similar to as described with respect to FIG. 16.

Figure 19:
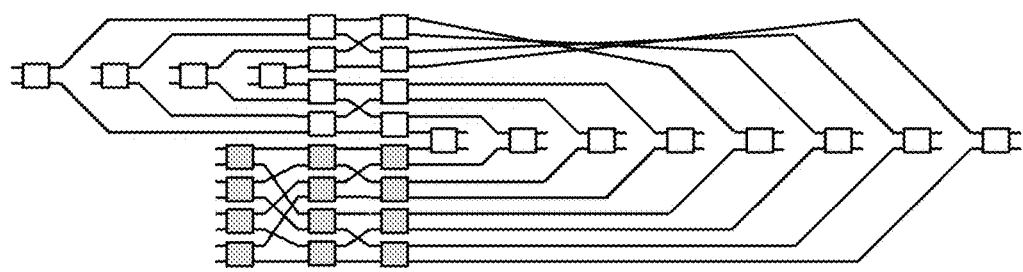
FIG. 19 illustrates a block diagram of another example, non-limiting butterfly network switch fabric topology in accordance with one or more embodiments described herein.

FIG. 19 illustrates a block diagram of another example, non-limiting butterfly network switch fabric topology in accordance with one or more embodiments described herein. Butterfly network 1900 continues the approach of butterfly network 1800. Here, as depicted with butterfly network 1900, another step is performed in reducing a number of waveguide crossings in a butterfly network, similar to as described with respect to FIG. 16.

Figure 20:
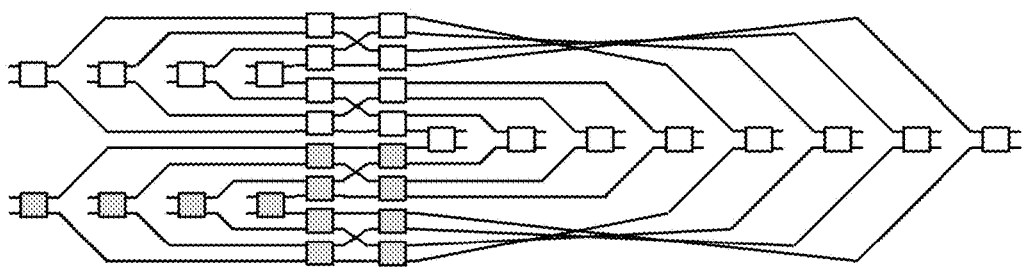
FIG. 20 illustrates a block diagram of another example, non-limiting butterfly network switch fabric topology in accordance with one or more embodiments described herein.

FIG. 20 illustrates a block diagram of another example, non-limiting butterfly network switch fabric topology in accordance with one or more embodiments described herein. Butterfly network 2000 continues the approach of butterfly network 1900. Here, as depicted with butterfly network 2000, another step is performed in reducing a number of waveguide crossings in a butterfly network, similar to as described with respect to FIG. 16.

Figure 21:
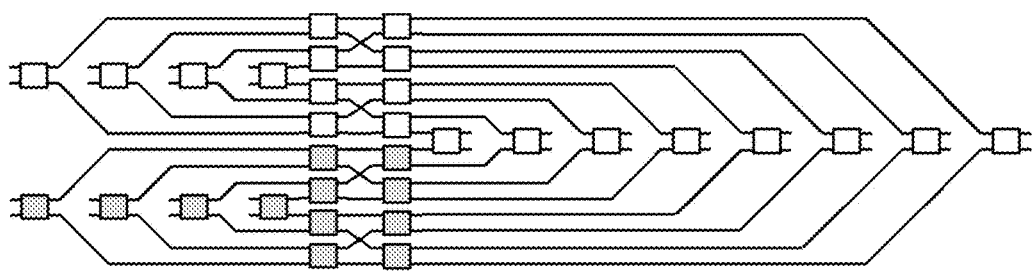
FIG. 21 illustrates a block diagram of another example, non-limiting butterfly network switch fabric topology in accordance with one or more embodiments described herein.

FIG. 21 illustrates a block diagram of another example, non-limiting butterfly network switch fabric topology in accordance with one or more embodiments described herein. Butterfly network 2100 continues the approach of butterfly network 2000. Here, as depicted with butterfly network 2100, another step is performed in reducing a number of waveguide crossings in a butterfly network, similar to as described with respect to FIG. 16.

As can be seen, the $2^{nd}$ through $2^{nd}$-to-last stages now form four (N/4×N/4) subnetworks. In butterfly network 2100, a step has been performed of, for switches in the first stage, nesting the $1^{st}$ switch in between the output waveguides of the $2^{nd}$, the $2^{nd}$ in between that of the third, etc. Additionally, a step has been performed of nesting the (N/2)th within the (N/2−1)th, the (N/2−1)th within the (N/2−2)th, etc. Additionally, a step has been performed of flipping the $1^{st}$ and $4^{th}$ subnetworks such that the input and output port vectors [1, 2, . . . , (N/4−1), (N/4)] are replaced with [N/4, (N/4−1), . . . , 2, 1]. Additionally a step has been performed of reordering the switches in the last stage as [N/2, (N/2−1), . . . (N/4+1), 1, 2, . . . , N/4]. A resulting network is a 16×16 network with either zero or one waveguide crossings in each waveguide path.

Figure 22:
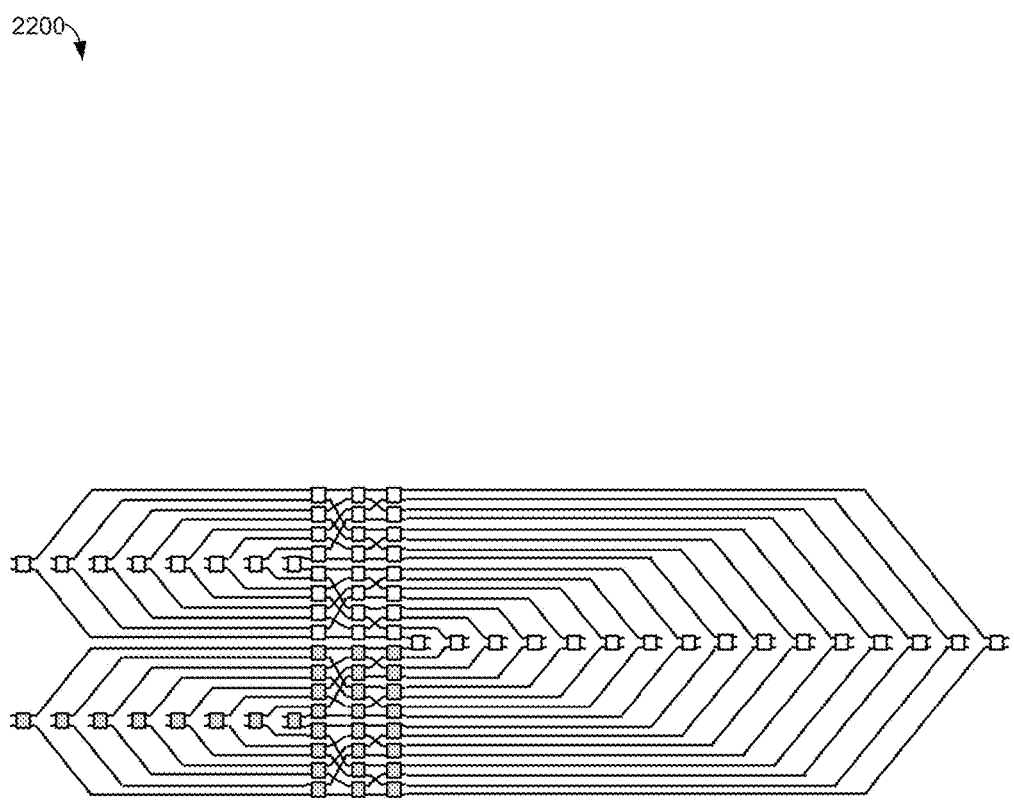
FIG. 22 illustrates a block diagram of another example, non-limiting butterfly network switch fabric topology in accordance with one or more embodiments described herein.

FIG. 22 illustrates a block diagram of another example, non-limiting butterfly network switch fabric topology in accordance with one or more embodiments described herein. Whereas butterfly network 2100 is a 16×16 butterfly network with either zero or one waveguide crossings in each waveguide path, here, butterfly network 2200 is a 32×32 butterfly network. Butterfly network 2200 has a maximum of four waveguide crossings in each waveguide path.

An approach to create the 32×32 butterfly network 2200 may be taken similar to the approach taken to create the 16×16 butterfly network of butterfly networks 1300, 1400, 1500, 1600, 1700, 1800, 1900, 2000, and 2100.

Figure 23:
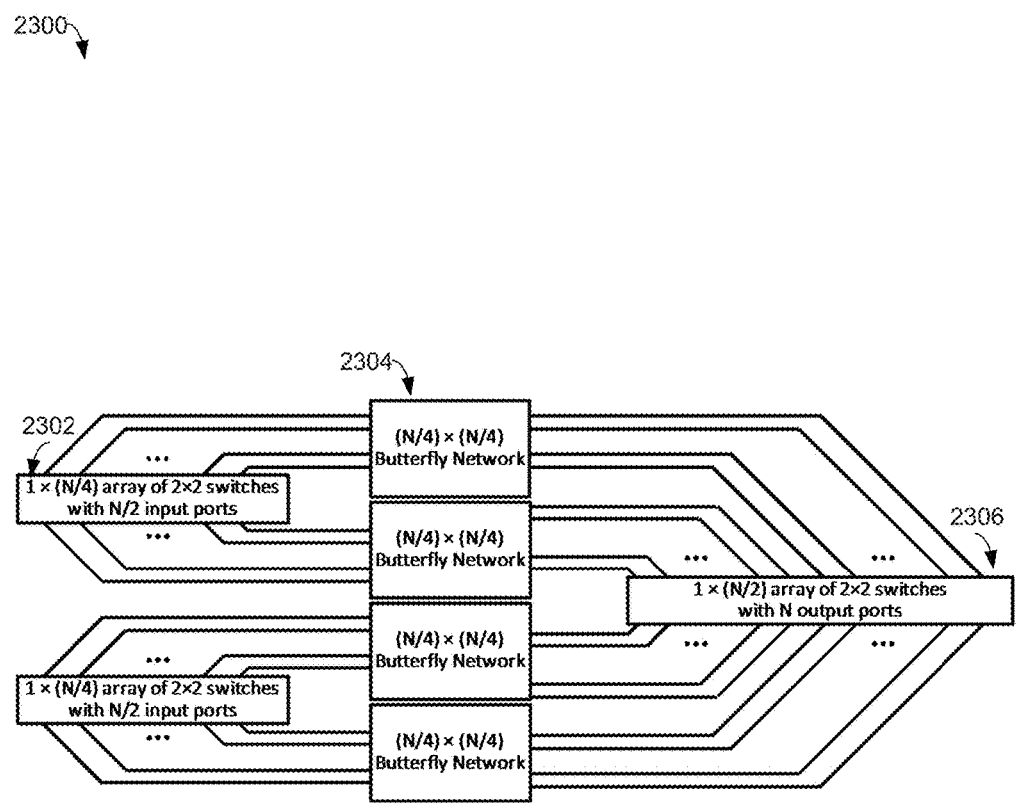
FIG. 23 illustrates a block diagram of another example, non-limiting butterfly network switch fabric topology in accordance with one or more embodiments described herein.

FIG. 23 illustrates a block diagram of another example, non-limiting butterfly network switch fabric topology in accordance with one or more embodiments described herein. Butterfly network 2300 is a N×N butterfly network, in contrast to the 16×16 butterfly network 2100, and the 32×32 butterfly network 2200. Butterfly network 2300 comprises 1×(N/4) array of 2×2 switches with N/2 input ports 2302. Butterfly network 2300 also comprises (N/4)×(N/4) Butterfly Network 2304. Butterfly network 2300 also comprises 1×(N/2) array of 2×2 switches with N output ports 2306.

Figure 24:
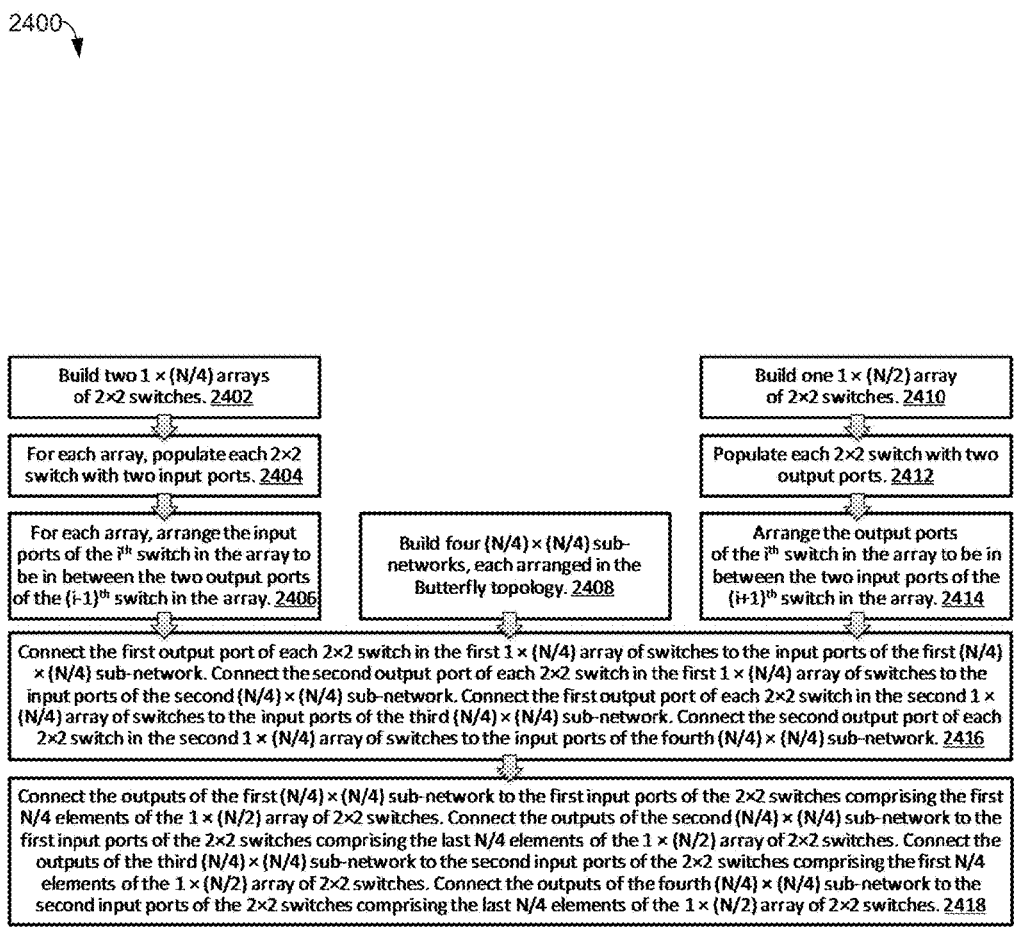
FIG. 24 illustrates a flow diagram of an example, non-limiting computer-implemented method that facilitates implementing a butterfly network switch fabric topology in accordance with one or more embodiments described herein.

FIG. 24 illustrates a flow diagram of an example, non-limiting computer-implemented method that facilitates implementing a butterfly network switch fabric topology in accordance with one or more embodiments described herein. In examples, aspects of this non-limiting computer implemented method can be implemented using computing system 100 or computing system 200. It can be appreciated that there can be examples where more or fewer operations are depicted than in flow diagram 1100, and/or that the operations depicted in flow diagram 1100 are implemented in a different order than is depicted here.

In flow diagram 2400, operation 2402 depicts building, by a computing system (e.g., computing system 100 or computing system 200), two 1×(N/4) arrays of 2×2 switches. Operation 2404 depicts, for each array, populating each 2×2 switch with two input ports. Operation 2406 depicts, for each array, arranging, by a computing system (e.g., computing system 100 or computing system 200), the input ports of the ith switch in the array to be in between the two output ports of the (i−1)th switch in the array. Operation 2408 depicts building four (N/4)×(N/4) sub-networks, each arranged in the Butterfly topology.

Operation 2410 depicts building, by a computing system (e.g., computing system 100 or computing system 200), one 1×(N/2) array of 2×2 switches.

Operation 2412 depicts populating, by a computing system (e.g., computing system 100 or computing system 200), each 2×2 switch with two output ports. Operation 2414 depicts arranging, by a computing system (e.g., computing system 100 or computing system 200), the output ports of the $i^{th}$ switch in the array to be in between the two input ports of the $(i+1)^{th}$ switch in the array.

Operation 2416 can be performed by a computing system (e.g., computing system 100 or computing system 200). Operation 2416 depicts connecting the first output port of each 2×2 switch in the first 1×(N/4) array of switches to the input ports of the first (N/4)×(N/4) sub-network. Then, operation 2416 depicts connecting the second output port of each 2×2 switch in the first 1×(N/4) array of switches to the input ports of the second (N/4)×(N/4) sub-network. Then, operation 2416 depicts connecting the first output port of each 2×2 switch in the second 1×(N/4) array of switches to the input ports of the third (N/4)×(N/4) sub-network. Then, operation 2416 depicts connecting the second output port of each 2×2 switch in the second 1×(N/4) array of switches to the input ports of the fourth (N/4)×(N/4) sub-network.

Operation 2418 can be performed by a computing system (e.g., computing system 100 or computing system 200). Operation 2418 depicts connecting the outputs of the first (N/4)×(N/4) sub-network to the first input ports of the 2×2 switches comprising the first N/4 elements of the 1×(N/2) array of 2×2 switches. Then, operation 2418 depicts connecting the outputs of the second (N/4)×(N/4) sub-network to the first input ports of the 2×2 switches comprising the last N/4 elements of the 1×(N/2) array of 2×2 switches. Then, operation 2418 depicts connecting the outputs of the third (N/4)×(N/4) sub-network to the second input ports of the 2×2 switches comprising the first N/4 elements of the 1×(N/2) array of 2×2 switches. Then, operation 2418 depicts connecting the outputs of the fourth (N/4)×(N/4) sub-network to the second input ports of the 2×2 switches comprising the last N/4 elements of the 1×(N/2) array of 2×2 switches.

Using these techniques, a 4×4 butterfly network topology can have 1 waveguide crossing in a standard configuration; and 0 waveguide crossings using these techniques. An 8×8 butterfly network can have 4 waveguide crossings in a standard configuration; and 0 waveguide crossings using these techniques. A 16×16 butterfly network can have 11 waveguide crossings in a standard configuration; and 1 waveguide crossing using these techniques. A 32×32 butterfly network can have 26 waveguide crossings in a standard configuration; and 4 waveguide crossings using these techniques. A 64×64 butterfly network can have 57 waveguide crossings in a standard configuration; and 11 waveguide crossings using these techniques. A generalized N×N butterfly network can have $(\frac{1}{2})N-1+X_{(N/2)}$ waveguide crossings in a standard configuration; and $X_{(N/4)}$ waveguide crossings using these techniques. In those expressions, $X_N$ represents a maximum number of crossings for any path in an N port network.

Figure 25:
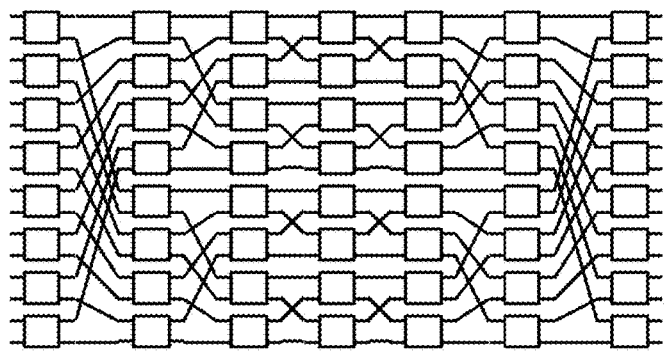
FIG. 25 illustrates a block diagram of an example, non-limiting Benes network switch fabric topology in accordance with one or more embodiments described herein.
Figure 25:
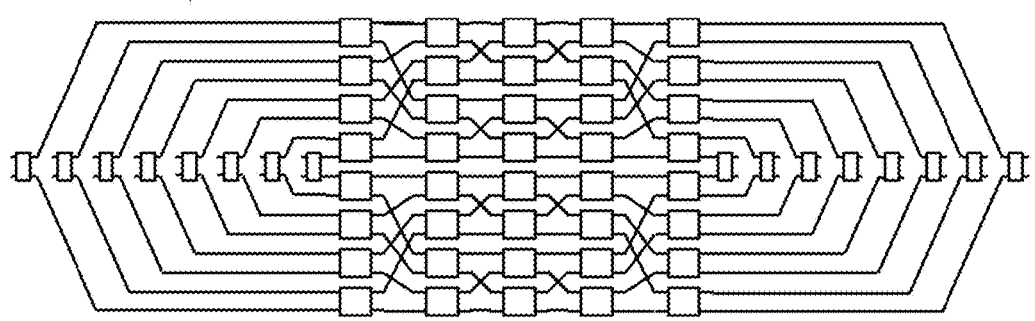

FIG. 25 illustrates a block diagram of an example, non-limiting Benes network switch fabric topology in accordance with one or more embodiments described herein. Benes network 2500 presents two variations of a Benes network. Benes network 2502 is a starting point Benes network, which can be rearranged to produce a Benes network with a reduced number of waveguide crossings—here, Benes network 2504. An approach for transforming Benes network 2502 into Benes network 2504 can be similar to that of Benes network 2600, as described with respect to FIG. 26.

Figure 26:
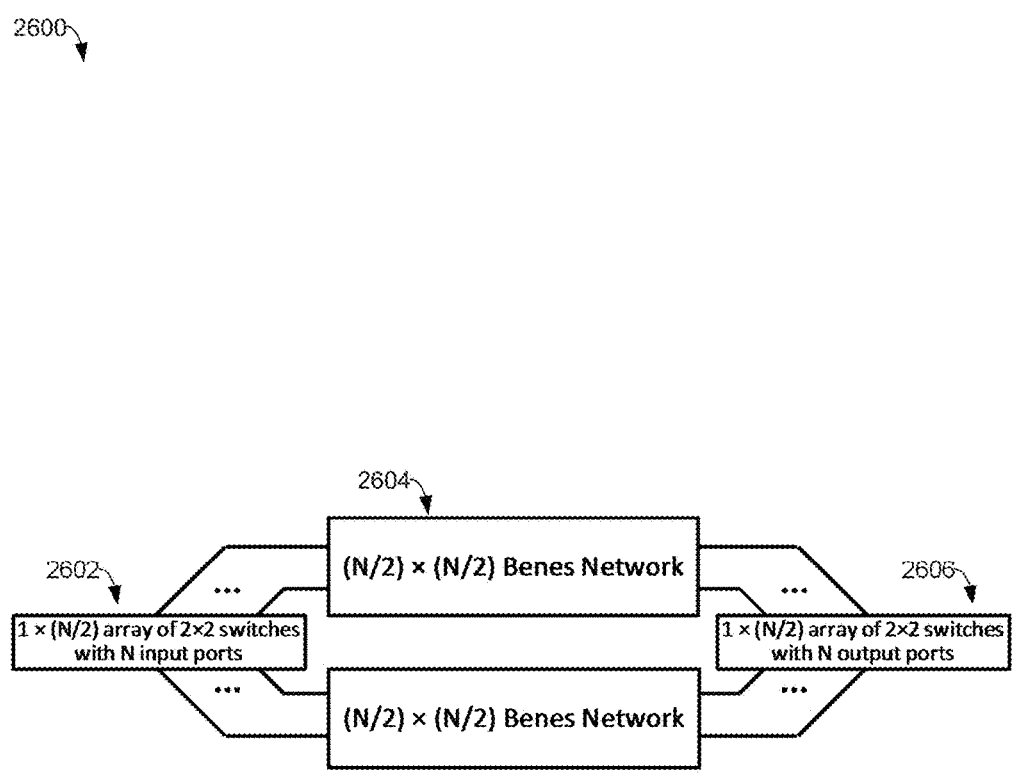
FIG. 26 illustrates a block diagram of another example, non-limiting Benes network switch fabric topology in accordance with one or more embodiments described herein.

FIG. 26 illustrates a block diagram of another example, non-limiting Benes network switch fabric topology in accordance with one or more embodiments described herein. Benes network 2600 is a generalized N×N Benes network, with reduced waveguide crossings. Benes network 2600 comprises 1×(N/2) array of 2×2 switches with N output ports 2602. Benes network 2600 also comprises (N/2)×(N/2) Benes Network 2604. Benes network 2600 also comprises 1×(N/2) array of 2×2 switches with N output ports 2606.

Using these techniques, a 4×4 Benes network topology can have 2 waveguide crossings in a standard configuration; and 0 waveguide crossings using these techniques. An 8×8 Benes network can have 8 waveguide crossings in a standard configuration; and 2 waveguide crossings using these techniques. A 16×16 Benes network can have 22 waveguide crossings in a standard configuration; and 8 waveguide crossings using these techniques. A 32×32 Benes network can have 52 waveguide crossings in a standard configuration; and 22 waveguide crossings using these techniques. A 64×64 Benes network can have 114 waveguide crossings in a standard configuration; and 52 waveguide crossings using these techniques. A generalized N×N Benes network can have $2N-2 \log_2 N-2$ waveguide crossings in a standard configuration; and $X_{(N/2)}$ waveguide crossings using these techniques. In those expressions, $X_N$ represents a maximum number of crossings for any path in an N port network.

Figure 27:
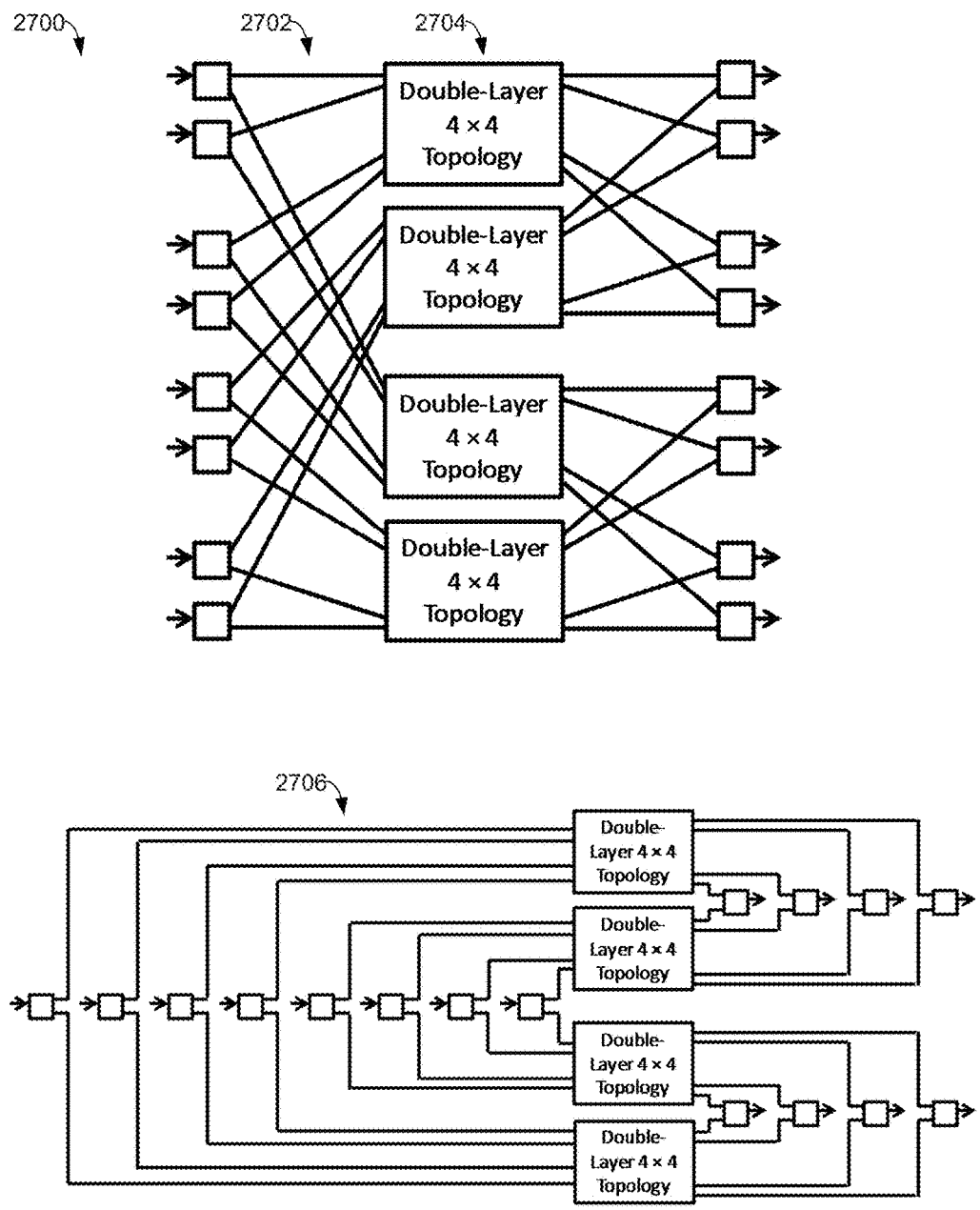
FIG. 27 illustrates a block diagram of an example, non-limiting double-layer switch fabric topology in accordance with one or more embodiments described herein.

FIG. 27 illustrates a block diagram of an example, non-limiting double-layer switch fabric topology in accordance with one or more embodiments described herein. Double-layer switch fabric topology 2700 presents two variations of a double-layer switch fabric topology. Double-layer switch fabric topology 2702 is a starting point double-layer switch fabric topology, which can be rearranged to produce a double-layer switch fabric topology network with a reduced number of waveguide crossings—here, double-layer switch fabric topology network 2706. Double-layer switch fabric topology 2702 comprises double-layer 4×4 topology 2704.

Figure 28:
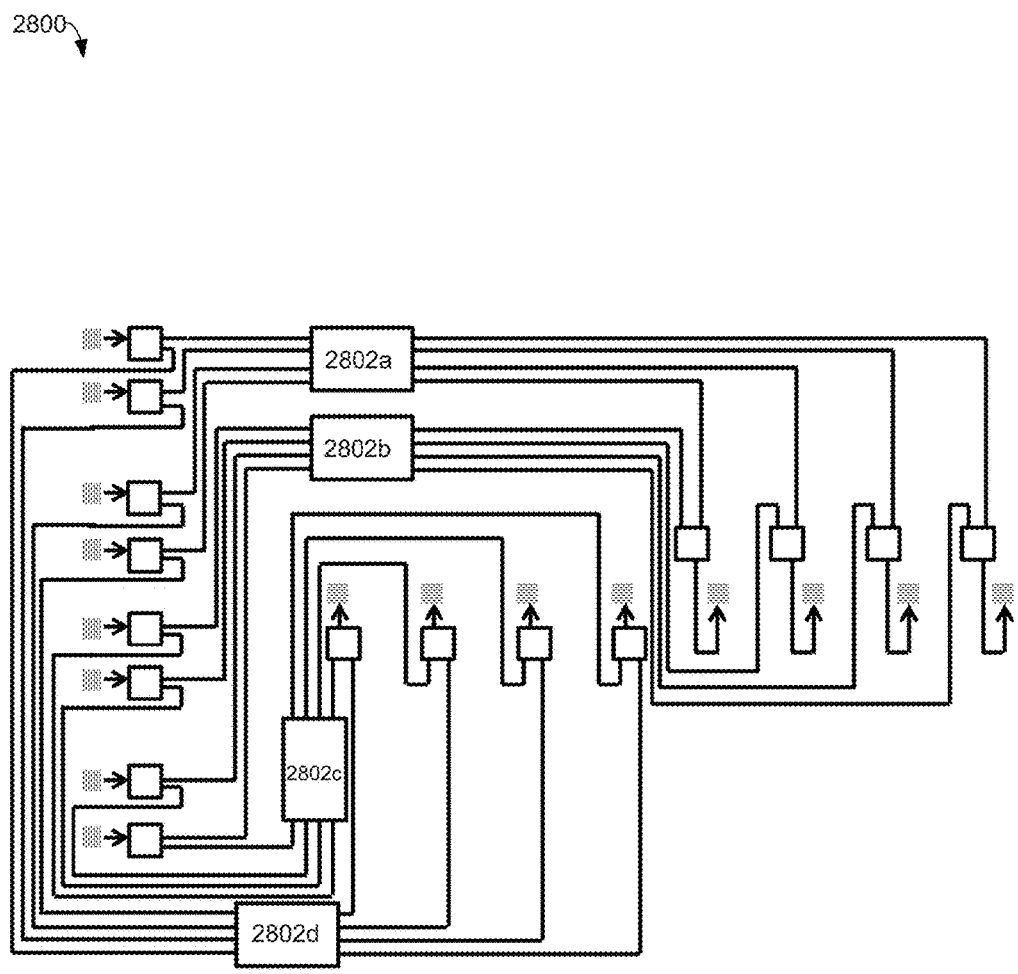
FIG. 28 illustrates a block diagram of another example, non-limiting double-layer switch fabric topology in accordance with one or more embodiments described herein.

FIG. 28 illustrates a block diagram of another example, non-limiting double-layer switch fabric topology in accordance with one or more embodiments described herein. Double-layer switch fabric topology 2800 is a double-layer switch fabric topology that has a reduced number of waveguide crossings relative to that of double-layer switch fabric topology 2702. Additionally, relative to double-layer switch fabric topology 2706, double-layer switch fabric topology 2700 has a linear input array, and a linear output array. Double-layer switch fabric topology 2800 comprises double-layer 4×4 topology 2802a; double-layer 4×4 topology 2802b; double-layer 4×4 topology 2802c; and double-layer 4×4 topology 2802d.

Using these techniques, a 4×4 double-layer network topology can have 4 waveguide crossings in a standard configuration; and 0 waveguide crossings using these techniques. An 8×8 double-layer network can have 14 waveguide crossings in a standard configuration; and 4 waveguide crossings using these techniques. A 16×16 double-layer network can have 36 waveguide crossings in a standard configuration; and 14 waveguide crossings using these techniques. A 32×32 double-layer network can have 82 waveguide crossings in a standard configuration; and 36 waveguide crossings using these techniques. A 64×64 double-layer network can have 176 waveguide crossings in a standard configuration; and 82 waveguide crossings using these techniques. A generalized N×N double-layer network can have $3N-2 \log_2 N-4$ waveguide crossings in a standard configuration; and $X_{(N/2)}$ waveguide crossings using these techniques. In those expressions, $X_N$ represents a maximum number of crossings for any path in an N port network.

Figure 29:
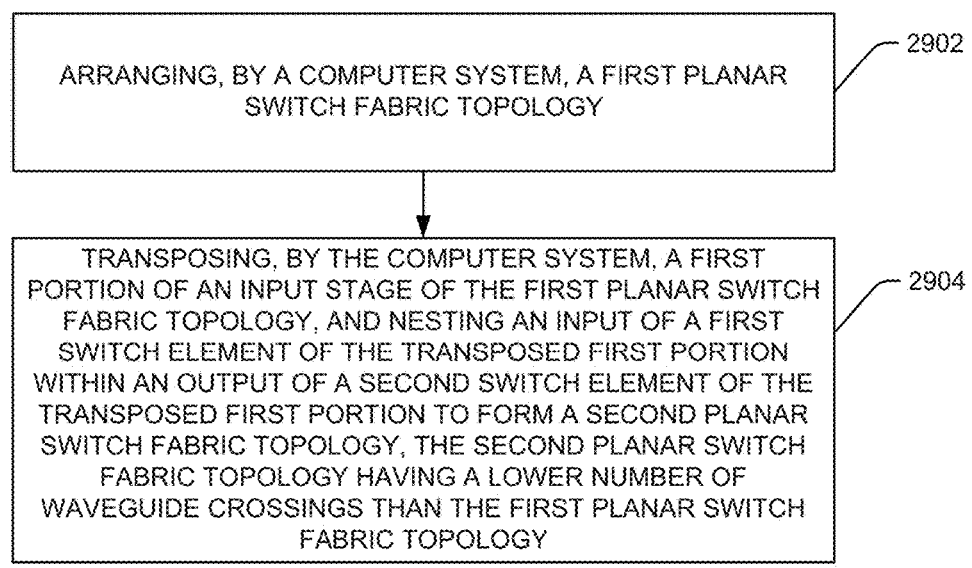
FIG. 29 illustrates another flow diagram of an example, non-limiting computer-implemented method that facilitates implementing planar photonic switch fabrics with reduced waveguide crossings, in accordance with one or more embodiments described herein.

FIG. 29 illustrates another flow diagram of an example, non-limiting computer-implemented method that facilitates implementing planar photonic switch fabrics with reduced waveguide crossings, in accordance with one or more embodiments described herein. In some examples, flow diagram 1200 can be implemented by computing system 100 or computing system 200. It can be appreciated that the operations of flow diagram 1200 are an example, and that there can be embodiments that implement more or fewer operations than are depicted, or that implement the depicted operations in a different order than is depicted. Flow diagram 1200 can be implemented, for example, to reduce waveguide crossings in a planar photonic switch fabric by routing a waveguide around a perimeter of a switch fabric, thus orienting an input and/or an output stage on an interior of the switch fabric.

Operation 2902 depicts arranging, by a computer system (e.g., computer system 100 or computer system 200), a first planar switch fabric topology. In some examples, operation 1202 can be implemented in a similar manner as operation 1102.

In some examples, the first planar switch fabric topology comprises a banyan network. A banyan network can generally comprise an interconnected 2×2 switching networks that are configured in multiple and recursive stages.

In some examples, the first planar switch fabric topology comprises a butterfly network, an omega network, a Benes network, a dilated banyan network, a dilated Benes network, or a double-layer network. An example of a butterfly network is depicted and described with respect to FIG. 13, among other figures. An omega network can generally comprise an indirect network topology that utilizes on a perfect shuffle interconnection algorithm. A Benes network can generally comprise a rearrangeably nonblocking network where there are n sources that feed into ingress stage crossbar switches, and each ingress stage crossbar switch has m outlets, as well as a number of middle stage crossbar switches is m. Then, n=m=2. A dilated banyan network can generally comprise a banyan network that is dilated where the switch fabric is modified so that each device carries one signal at once. A dilated Benes network can generally comprise a Benes network that is dilated where the switch fabric is modified so that each device carries one signal at once. A double-layer network can generally comprise a strictly nonblocking network that comprises two separate layers.

In some examples, the first planar switch fabric topology comprises a binary tree routing structure. A binary tree routing structure can generally comprise a network topology where each node of the topology has up to two connecting branches. In some examples, the first planar switch fabric topology comprises alternating switch stages and shuffle-exchange stages. A switch stage can generally comprise a stage that connects one of a plurality of inputs to one of a plurality of outputs. In general, a shuffle-exchange stage can generally comprise a stage that performs a permutation on a source address of a received signal to determine a destination address for that signal.

Operation 2904 depicts transposing, by a computer system (e.g., computer system 100 or computer system 200), a first portion of an input stage of the first planar switch fabric topology, and nesting an input of a first switch element of the transposed first portion within an output of a second switch element of the transposed first portion to form a second planar switch fabric topology, the second planar switch fabric topology having a lower number of waveguide crossings than the first planar switch fabric topology. That is, the functionality of one input stage may be transposed in a second input stage placed elsewhere in the fabric topology, and a corresponding portion of switch fabric of the switch fabric topology may be nested to accompany this transposed input switch.

In some examples, operation 2904 comprises transposing, by a computer system (e.g., computer system 100 or computer system 200), a second portion of an output stage of the first planar switch fabric topology to form the second planar switch fabric topology. Similar as to described above with respect to an input stage, a similar operation may be performed regarding an output stage.

In some examples, the transposed first portion comprises an array of nested switch elements connected to a previous stage of the second planar switch fabric topology independent of a waveguide crossing. That is, in some examples, the process of transposing the first portion can result in forming an array of nested switch elements (such as depicted and described with respect to FIG. 16), and in doing so, corresponding waveguides can have zero waveguide crossings.

Figure 30:
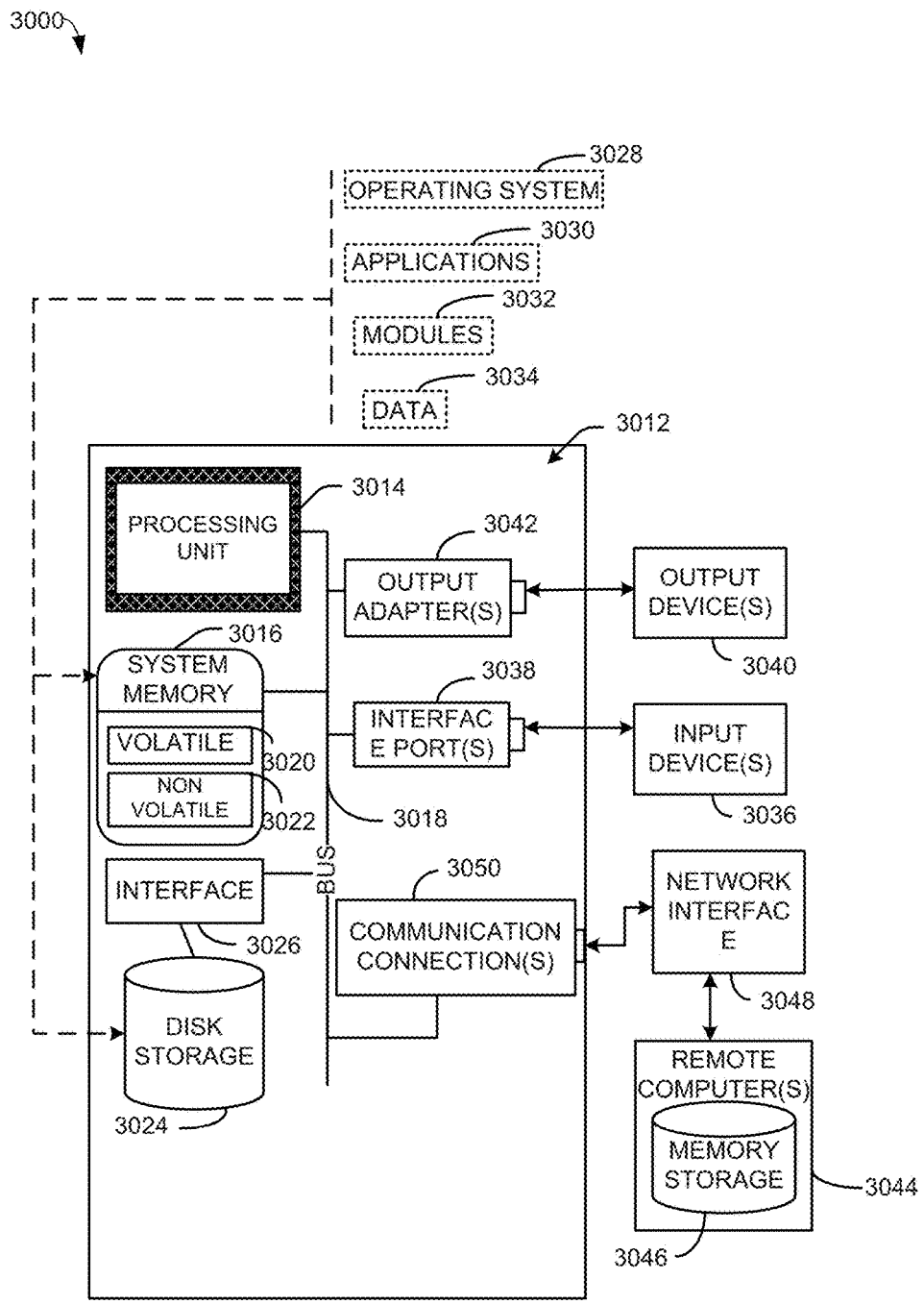
FIG. 30 illustrates a block diagram of an example non-limiting operating environment in which one or more embodiments described herein can be facilitated.

In order to provide a context for the various aspects of the disclosed subject matter, FIG. 30 as well as the following discussion are intended to provide a general description of a suitable computing environment in which the various aspects of the disclosed subject matter can be implemented. In some examples, this computing environment can be used to implement computing system 102a, computing system 102b, computing system 102c, planar photonic switch fabric formation computing system 108, or computing system 200. FIG. 30 illustrates a block diagram of an example, non-limiting operating environment in which one or more embodiments described herein can be facilitated. Repetitive description of like elements employed in other embodiments described herein is omitted for sake of brevity.

With reference to FIG. 30, a suitable operating environment 3001 for implementing various aspects of this disclosure can also include a computer 3012. The computer 3012 can also include a processing unit 3014, a system memory 3016, and a system bus 3018. The system bus 3018 couples system components including, but not limited to, the system memory 3016 to the processing unit 3014. The processing unit 3014 can be any of various available processors. Dual microprocessors and other multiprocessor architectures also can be employed as the processing unit 3014. The system bus 3018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 3016 can also include volatile memory 3020 and nonvolatile memory 3022. The basic input/output system (BIOS), containing the basic routines to transfer information between elements within the computer 3012, such as during start-up, is stored in nonvolatile memory 3022. By way of illustration, and not limitation, nonvolatile memory 3022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 3020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 3012 can also include removable/non-removable, volatile/nonvolatile computer storage media. FIG. 30 illustrates, for example, a disk storage 3024. Disk storage 3024 can also include, but is not limited to, devices like a magnetic disk drive, floppy disk drive, tape drive, Jaz drive, Zip drive, LS-100 drive, flash memory card, or memory stick. The disk storage 3024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 3024 to the system bus 3018, a removable or non-removable interface is typically used, such as interface 3026. FIG. 30 also depicts software that acts as an intermediary between users and the basic computer resources described in the suitable operating environment 3001. Such software can also include, for example, an operating system 3028. Operating system 3028, which can be stored on disk storage 3024, acts to control and allocate resources of the computer 3012. System applications 3030 take advantage of the management of resources by operating system 3028 through program modules 3032 and program data 3034, e.g., stored either in system memory 3016 or on disk storage 3024. It is to be appreciated that this disclosure can be implemented with various operating systems or combinations of operating systems. A user enters commands or information into the computer 3012 through input device(s) 3036. Input devices 3036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 3014 through the system bus 3018 via interface port(s) 3038. Interface port(s) 3038 include, for example, a serial port, a parallel port, a game port, and a universal serial bus (USB). Output device(s) 3040 use some of the same type of ports as input device(s) 3036. Thus, for example, a USB port can be used to provide input to computer 3012, and to output information from computer 3012 to an output device 3040. Output adapter 3042 is provided to illustrate that there are some output devices 3040 like monitors, speakers, and printers, among other output devices 3040, which require special adapters. The output adapters 3042 include, by way of illustration and not limitation, video and sound cards that provide a means of connection between the output device 3040 and the system bus 3018. It should be noted that other devices and/or systems of devices provide both input and output capabilities such as remote computer(s) 3044.

Computer 3012 can operate in a networked environment using logical connections to one or more remote computers, such as remote computer(s) 3044. The remote computer(s) 3044 can be a computer, a server, a router, a network PC, a workstation, a microprocessor based appliance, a peer device or other common network neuron and the like, and typically can also include many or all of the elements described relative to computer 3012. For purposes of brevity, only a memory storage device 3046 is illustrated with remote computer(s) 3044. Remote computer(s) 3044 is logically connected to computer 3012 through a network interface 3048 and then physically connected via communication connection 3050. Network interface 3048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 3050 refers to the hardware/software employed to connect the network interface 3048 to the system bus 3018. While communication connection 3050 is shown for illustrative clarity inside computer 3012, it can also be external to computer 3012. The hardware/software for connection to the network interface 3048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
   an arrangement component that arranges a first planar switch fabric topology; and
   a waveguide routing component that routes a first waveguide of the first planar switch fabric topology around a perimeter of a first input/output (I/O) stage of the first planar switch fabric topology to produce a second planar switch fabric topology, the first I/O stage being located on an interior of the second planar switch fabric topology, the second planar switch fabric topology having a lower number of waveguide crossings than the first planar switch fabric topology;
   wherein a signal, an input or a light wave is injected into the first I/O stage of the second planar switch fabric topology using a second waveguide located on a separate planar layer as the first waveguide; and
   wherein a first layer of the second planar switch fabric topology is fabricated in a silicon layer, and a second layer of the second planar switch fabric topology that comprises the second waveguide is fabricated in silicon nitride.

2. The system of claim 1, wherein the first I/O stage comprises an input stage or an output stage.

3. The system of claim 1, wherein the second planar switch fabric topology comprises a data receiving optical detector that is integrated within an interior of the second planar switch fabric topology.

4. A computer-implemented method, comprising:
arranging, by a system operatively coupled to a processor, a first planar switch fabric topology; and
routing, by the system, a first waveguide of the first planar switch fabric topology around a perimeter of a first input/output (I/O) stage of the first planar switch fabric topology to produce a second planar switch fabric topology, the first I/O stage being located on an interior of the second planar switch fabric topology, the second planar switch fabric topology having a lower number of waveguide crossings than the first planar switch fabric topology; and
injecting by the system, a signal, an input or a light wave into the first I/O stage of the second planar switch fabric topology using a second waveguide located on a separate planar layer as the first waveguide, wherein a first layer of the second planar switch fabric topology is fabricated in a silicon layer, and a second layer of the second planar switch fabric topology that comprises the second waveguide is fabricated in silicon nitride.

5. The computer-implemented method of claim 4, wherein the first I/O stage comprises an input stage or an output stage.

6. The computer-implemented method of claim 4, wherein the second planar switch fabric topology comprises a data transmitting optical emitter that is integrated within an interior of the second planar switch fabric topology.

7. A computer program product that facilitates implementation of planar photonic switch fabrics with reduced waveguide crossings, the computer program product comprising a computer readable storage medium having program instructions embodied therewith, the program instructions being executable by a processor to cause the processor to:
arrange a first planar switch fabric topology; and
route a first waveguide of the first planar switch fabric topology around a perimeter of a first input/output (I/O) stage of the first planar switch fabric topology to produce a second planar switch fabric topology, the first I/O stage being located on an interior of the second planar switch fabric topology, the second planar switch fabric topology having a lower number of waveguide crossings than the first planar switch fabric topology;
wherein a signal, an input or a light wave is injected into the first I/O stage of the second planar switch fabric topology using a second waveguide located on a separate planar layer as the first waveguide; and
wherein a first layer of the second planar switch fabric topology is fabricated in an indium phosphide layer, and a second layer of the second planar switch fabric topology that comprises the second waveguide is fabricated in silicon nitride.

8. The computer program product of claim 7, wherein the first I/O stage comprises an input stage or an output stage.

9. The computer program product of claim 7, wherein the second planar switch fabric topology comprises a data receiving optical detector that is integrated within an interior of the second planar switch fabric topology.

* * * * *